US008531780B2

(12) United States Patent
Tsai et al.

(10) Patent No.: US 8,531,780 B2

(45) Date of Patent: Sep. 10, 2013

(54) OPTICAL IMAGING LENS ASSEMBLY

(75) Inventors: Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 81 days.

(21) Appl. No.: 13/182,068

(22) Filed: Jul. 13, 2011

(65) Prior Publication Data

US 2012/0113530 A1 May 10, 2012

(30) Foreign Application Priority Data

Nov. 10, 2010 (TW) ................................ 99138677 A

(51) Int. Cl.
*G02B 9/34* (2006.01)

(52) U.S. Cl.
CPC ........................................ *G02B 9/34* (2013.01)
USPC ............................ 359/715; 359/753; 359/781

(58) Field of Classification Search
CPC .............. G02B 3/02; G02B 9/34; G02B 9/60; G02B 9/62; G02B 9/64; G02B 13/004; G02B 13/0045; G02B 13/04
USPC ................ 359/708–715, 749–753, 754–757, 359/761, 763, 770, 771, 781
See application file for complete search history.

(56) References Cited

U.S. PATENT DOCUMENTS

| | | | | |
|---|---|---|---|---|
| 7,230,775 | B2 * | 6/2007 | Kato | 359/745 |
| 7,397,612 | B2 | 7/2008 | Chen et al. | |
| 7,446,955 | B1 | 11/2008 | Noda | |
| 7,933,077 | B1 | 4/2011 | Tsai | |

FOREIGN PATENT DOCUMENTS

| | | | |
|---|---|---|---|
| TW | M313780 | U | 6/2007 |
| TW | M351358 | U | 2/2009 |
| TW | M366075 | U | 10/2009 |

* cited by examiner

*Primary Examiner* — Darryl J Collins

(74) *Attorney, Agent, or Firm* — Muncy, Geissler, Olds & Lowe, PLLC

(57) ABSTRACT

An optical imaging lens assembly comprises, in order from an object side to an image side, a first lens element, a second lens element, a third lens element and a fourth lens element. There is a stop disposed between the first lens element and the third lens element. The first lens element has negative refractive power, the second lens element has positive refractive power, the third lens element has negative refractive power, and the fourth lens element has positive refractive power. The first lens element has a convex object-side surface and a concave image-side surface. The third lens element and the fourth lens element both have at least one of its object-side surface and its image-side surface being aspheric. With the aforementioned arrangement, the optical imaging lens assembly of the present invention can obtain a larger viewing angle, lower sensitivity and higher resolution.

22 Claims, 11 Drawing Sheets

OPTICAL IMAGING LENS ASSEMBLY

This application claims priority to Taiwan Patent Application No. 099138677 filed on Nov. 10, 2010, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to an optical imaging lens assembly, which can provide a wider viewing angle, reduced sensitivity of the optical system and higher resolution, utilized in portable electronics.

2. Descriptions of the Related Art

With the widespread use of portable electronic products over recent years, portable electronic products with a photographing function have particularly gained great popularity among consumers. For the purpose of meeting consumers' demand regarding the performance of pixels and picture quality, the development of miniaturized photographic lenses has become more important.

For the common photographic lens, a photosensitive element used therein is either a charge coupled device (CCD) or a complementary metal-oxide semiconductor (CMOS) sensor. Moreover, as semiconductor manufacturing technologies have advanced in great magnitude, the pixels of the photosensitive elements are further reduced in size, which can provide a greater number of pixels for miniaturized photographic lens systems. Therefore, the demand on high quality imaging devices increases with an even faster pace.

As illustrated in U.S. Pat. No. 7,397,612, conventional photographic lenses with a wide viewing angle, which are disposed in portable electronic products, mostly adopt an inverse telephoto structure in which the front lens assembly has negative refractive power and the rear lens assembly has positive refractive power to obtain a wide viewing angle for imaging a larger area. However, an optical system that adopts the three-lens configuration still has shortcomings in terms of optical imaging quality as compared to a four-lens optical system and, consequently, fails to meet the requirement on the optical imaging quality.

Furthermore, as illustrated in U.S. Pat. No. 7,446,955, a four-lens optical system, which can provide a wide viewing angle of nearly 140 degrees, is disclosed. However, a stop thereof is disposed at the back end of the optical system and is very close to the image plane. Moreover, the one lens element that is disposed behind the stop for aberration compensation has a limited correction capability, thereby, having an adverse effect on the imaging quality.

In view of this, an urgent need exists in the art to provide an optical imaging lens assembly with a wide viewing angle, superior imaging quality and a desirable total track length.

SUMMARY OF THE INVENTION

An objective of the present invention is to provide an optical imaging lens assembly, which comprises a first lens element with negative refractive power, a second lens element with positive refractive power, a third lens element with negative refractive power, a fourth lens element with positive refractive power, and a stop. By defining the parameters such as the curvature radius, thickness, refractive index, Abbe number and focal length of each of the lens elements, an optical imaging lens assembly with a wide viewing angle, good imaging quality and a desirable total track length is obtained.

To achieve the aforesaid objective, an optical imaging lens assembly of the present invention comprises, in order from an object side to an image side, a first lens element, a second lens element, a third lens element, a fourth lens element, and a stop that is disposed between the first lens element and the third lens element. The optical imaging lens assembly has four lens elements with refractive power. The first lens element with negative refractive power has a convex object-side surface and a concave image-side surface; the second lens element has positive refractive power; the third lens element with negative refractive power has a concave image-side surface and has at least one of the object-side and image-side surfaces thereof being aspheric; and the fourth lens element with positive refractive power has a convex image-side surface, and has either an aspheric object-side surface or image-side surface of the fourth lens element.

A thickness (i.e. a central thickness) of the first lens element is CT1, a thickness (i.e. a central thickness) of the fourth lens element is CT4, a curvature radius of the object-side surface of the third lens element is R5, a curvature radius of the image-side surface of the third lens element is R6, an axial distance between the stop and an image plane is SL, an axial distance from the object-side surface of the first lens element of the optical imaging lens assembly and the image plane is TTL, and they satisfy the following relations:

$$0.3<CT4/CT1<1.5$$

$$-1.5<R6/R5<1.5$$

$$0.40<SL/TTL<0.75$$

To achieve the aforesaid objective, another optical imaging lens assembly of the present invention comprises, in order from an object side to an image side, a first lens element, a second lens element, a third lens element, a fourth lens element, and a stop disposed between the first lens element and the third lens element. The optical imaging lens assembly has four lens elements with refractive power. The first lens element with negative refractive power has a convex object-side surface and a concave image-side surface; the second lens element with positive refractive power has a convex object-side surface; a third lens element, which is made of plastic, with negative power that has at least one of the object-side and image-side surfaces thereof being aspheric; and a fourth lens element, that is made of plastic, with positive refractive power that has at least one of the object-side and image-side surfaces thereof being aspheric.

When a curvature radius of the object-side surface of the first lens element is R1, a curvature radius of the image-side surface of the first lens element is R2, a curvature radius of the object-side surface of the second lens element is R3, a curvature radius of an image-side surface of the second lens element is R4, a distance on an optical axis between the third lens element and the fourth lens element is T34, a focal length of the optical imaging lens assembly is f, a refractive index of the first lens element is N1, a refractive index of the second lens element is N2, and a refractive index of the third lens element is N3, and they satisfy the following relations:

$$2.1<(R1+R2)/(R1-R2)<5.0$$

$$-1.5<R3/R4<1.5$$

$$1.2<(T34/f)*100<15.0$$

$$|N2+N3-2N1|<0.15$$

To achieve the aforesaid objective, yet another optical imaging lens assembly of the present invention comprises, in order from an object side to an image side, a first lens element, a second lens element, a third lens element, a fourth lens element, and a stop disposed between the first lens element and the third lens element. The first lens element with negative refractive power has a convex object-side surface and a concave image-side surface; the second lens element with positive refractive power has a convex object-side surface and a convex image-side surface; the third lens element with negative refractive power has a concave image-side surface that has at least one of the object-side and image-side surfaces thereof being aspheric; and the fourth lens element with positive refractive power has a convex image-side surface that has at least one of the object-side and image-side surfaces thereof being aspheric.

A focal length of the optical imaging lens assembly is f, a focal length of the second lens element is f2, a distance between a position of the largest effective diameter of the image-side surface of the first lens element and a tangent through a vertex on the optical axis of the image-side surface of the first lens element is SAG12, the central thickness of the first lens element is CT1, and they satisfy the following relations:

$$0.9<f/f2<1.5$$

$$1.5<SAG12/CT1<2.5$$

The detailed technology and preferred embodiments implemented for the subject invention are described in the following paragraphs accompanying the appended drawings for people skilled in this field to well appreciate the features of the claimed invention.

BRIEF DESCRIPTION OF THE ATTACHED TABLES

Table 1 shows optical data according to the first embodiment of the present invention;

Table 2 shows aspheric data according to the first embodiment of the present invention;

Table 3 shows optical data according to the second embodiment of the present invention;

Table 4 shows aspheric data according to the second embodiment of the present invention;

Table 5 shows optical data according to the third embodiment of the present invention;

Table 6 shows aspheric data according to the third embodiment of the present invention;

Table 7 shows optical data according to the fourth embodiment of the present invention;

Table 8 shows aspheric data according to the fourth embodiment of the present invention;

Table 9 shows optical data according to a fifth embodiment of the present invention;

Table 10 shows aspheric data according to the fifth embodiment of the present invention; and Table 11 is a data list corresponding to the related parameters in the embodiments of the present invention.

DESCRIPTION OF THE PREFERRED EMBODIMENT

Figure 1A:
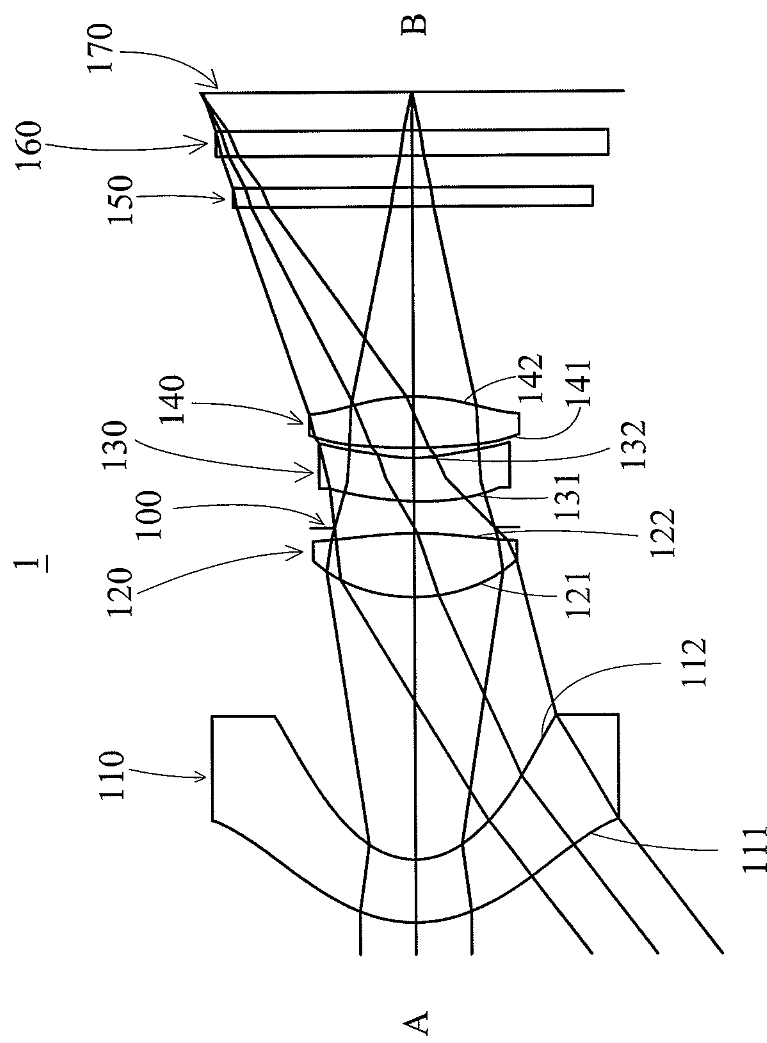
FIG. 1A is a schematic view of an optical imaging lens assembly according to the first embodiment of the present invention.

The present invention provides an optical imaging lens assembly, which comprises, in order from an object side to an image side, a first lens element, a second lens element, a third lens element, a fourth lens element, and a stop, which can be an aperture stop, disposed between the first lens element and the third lens element. The first lens element with negative refractive power has a convex object-side surface and a concave image-side surface; preferably, the first lens element is a convex-concave meniscus lens element to provide a wider field angle and facilitate the correction of astigmatism of the optical imaging lens assembly. The second lens element has positive refractive power. The third lens element with negative refractive power has a concave image-side surface with either an aspheric object-side surface or image-side surface. The fourth lens element with positive refractive power has a convex image-side surface with either an aspheric object-side surface or image-side surface.

Expanding upon the above description, when a thickness (i.e. a central thickness) of the first lens element is CT1 and a thickness (i.e. a central thickness) of the fourth lens element is CT4, satisfying the relationship of $0.3<CT4/CT1<1.5$ will ensure that the thicknesses of the fourth lens element and the first lens element are not too large or too small to ease the assembly and arrangement of the lenses.

When a curvature radius of the object-side surface of the third lens element is R5 and a curvature radius of the image-side surface of the third lens element is R6, satisfying the relationship of $-1.5<R6/R5<1.5$ will facilitate the correction of astigmatism and distortion of the optical imaging lens assembly and also effectively reduce an incident angle on an image sensor. Moreover, R6/R5 can further satisfy the relationship of $-0.5<R6/R5<0.5$ to increase the photosensitivity of the image sensor and reduce the possibility that shading occurs in the optical imaging lens assembly.

When an axial distance between the stop and an image plane is SL and an axial distance the object-side surface of the first lens element of the optical imaging lens assembly and the image plane is TTL, satisfying the relationship of 0.40<SL/

TTL<0.75 will facilitate the optical imaging lens assembly to be well balanced between the telecentric characteristic and wide field angle.

In the aforesaid optical imaging lens assembly of the present invention, the second lens element is preferred to have a convex object-side surface. The third lens element and the fourth lens element are made of plastic. Use of plastic lens elements can reduce the weight of the lens assembly effectively and further lower the manufacturing cost effectively.

At least one inflection point is formed on at least one of the object-side surface and the image-side surface of the fourth lens element. This can effectively suppress an incident angle of an off-axis field light on the image sensor and further correct the aberration of the off-axis field.

The optical imaging lens assembly further comprises an image sensor at the image plane, when half of a diagonal length of an effective photosensitive area of the image sensor is Imgh, and a focal length of the optical imaging lens assembly is f, satisfying the relationship of 0.70<Imgh/f<0.92 and provides the optical imaging lens assembly with an acceptably large field angle.

When a distance between the object-side surface of the first lens element and the object-side surface of the second lens element is Dr1*r*3 and a distance between the object-side surface of the second lens element and the image-side surface of the fourth lens element is Dr3*r*8, satisfying the relationship of 1.2<Dr1*r*3/Dr3*r*8<2.0 will make the first lens element be a proper distance from other lens elements to reduce the total length of the optical imaging lens assembly.

When an Abbe number of the third lens element is V3 and an Abbe number of the fourth lens element is V4, satisfying the relationship of 28<V4−V3<45 will correct the chromatic aberration in the optical imaging lens assembly.

Another optical imaging lens assembly of the present invention comprises, in order from an object side to an image side, a first lens element, a second lens element, a third lens element, a fourth lens element, and a stop disposed between the first lens element and the third lens element. The first lens element with negative refractive power has a convex object-side surface and a concave image-side surface; the second lens element with positive refractive power has a convex object-side surface; the third lens element, which is made of plastic, has at least an aspheric object-side surface or image-side surface; and the fourth lens element, which is made of plastic, has at least one of the object-side surface and image-side surface thereof being aspheric.

When a curvature radius of the object-side surface of the first lens element is R1 and a curvature radius of the image-side surface of the first lens element is R2, satisfying the relationship of 2.1<(R1+R2)/(R1−R2)<5.0 will contribute to a wider field angle of the photographing optical imaging lens assembly so that the photographing optical imaging lens assembly also features a wide field angle.

When a curvature radius of the object-side surface of the second lens element is R3 and a curvature radius of an image-side surface of the second lens element is R4, satisfying the relationship of −1.5<R3/R4<1.5 will facilitate the correction of spherical aberration of the optical imaging lens assembly. Moreover, the aforesaid relation preferably satisfies −0.7<R3/R4<−0.05.

When a distance on the optical axis between the third lens element and the fourth lens element is T34 and a focal length of the optical imaging lens assembly is f, satisfying the relationship of 1.2<(T34/f)*100<15.0 can prevent astigmatism from becoming unduly large. Moreover, the aforesaid relation preferably satisfies 1.5<(T34/f)*100<7.0.

When a refractive index of the first lens element is N1, a refractive index of the second lens element is N2 and a refractive index of the third lens element is N3, satisfying the relationship of |N2+N3−2N1|<0.15 will facilitate the appropriate matching of the first lens element, the second lens element and the third lens element in selection of optical materials.

In the aforesaid optical imaging lens assembly of the present invention, the third lens element preferably has a concave image-side surface, which can make a principal point of the system further away from the image plane and facilitate the reduction of the total optical length of the system to keep the optical imaging lens assembly miniaturized. Furthermore, the fourth lens element has a convex image-side surface, and the object-side surface of the fourth lens element may be concave or convex. If the object-side surface and the image-side surface of the fourth lens element are concave and convex respectively, then correction of astigmatism of the system can be enhanced and the correction of the high-order aberration of the system can be made easier. Otherwise, if both the object-side surface and the image-side surface of the fourth lens element are convex, then the positive refractive power of the second lens element can be enhanced and the sensitivity of the system can be reduced.

Yet a further optical imaging lens assembly of the present invention comprises, in order from an object side to an image side, a first lens element, a second lens element, a third lens element, a fourth lens element, and a stop disposed between the first lens element and the third lens element. The first lens element with negative refractive power has a convex object-side surface and a concave image-side surface; the second lens element with positive refractive power has a convex object-side surface and a convex image-side surface; the third lens element with negative refractive power has a concave image-side surface and has either an aspheric object-side surface or image-side surface; and the fourth lens element with positive refractive power has a convex image-side surface, and has either an aspheric object-side surface or image-side surface.

In the aforesaid optical imaging lens assembly of the present invention, the second lens element is a biconvex lens element, so the positive refractive power of the second lens element is enhanced and the optical length of the optical imaging lens assembly is reduced effectively. Moreover, the image-side surface of the third lens element is concave to make the principal point of the optical imaging lens assembly further away from the image plane, which facilitates the reduction of the total optical length of the optical imaging lens assembly to keep the optical imaging lens assembly miniaturized; furthermore, the image-side surface of the fourth lens element is convex, which helps to enhance the positive refractive power of the second lens element and reduce the sensitivity of the system as a whole.

When a focal length of the optical imaging lens assembly is f, a focal length of the second lens element is f2 and the relationship of 0.9<f/f2<1.5 is satisfied; as a result, the positive refractive power of the second lens element will be of an appropriate magnitude and the total length of the system can be controlled effectively to keep an miniaturization of the optical imaging lens assembly.

Figure 6:
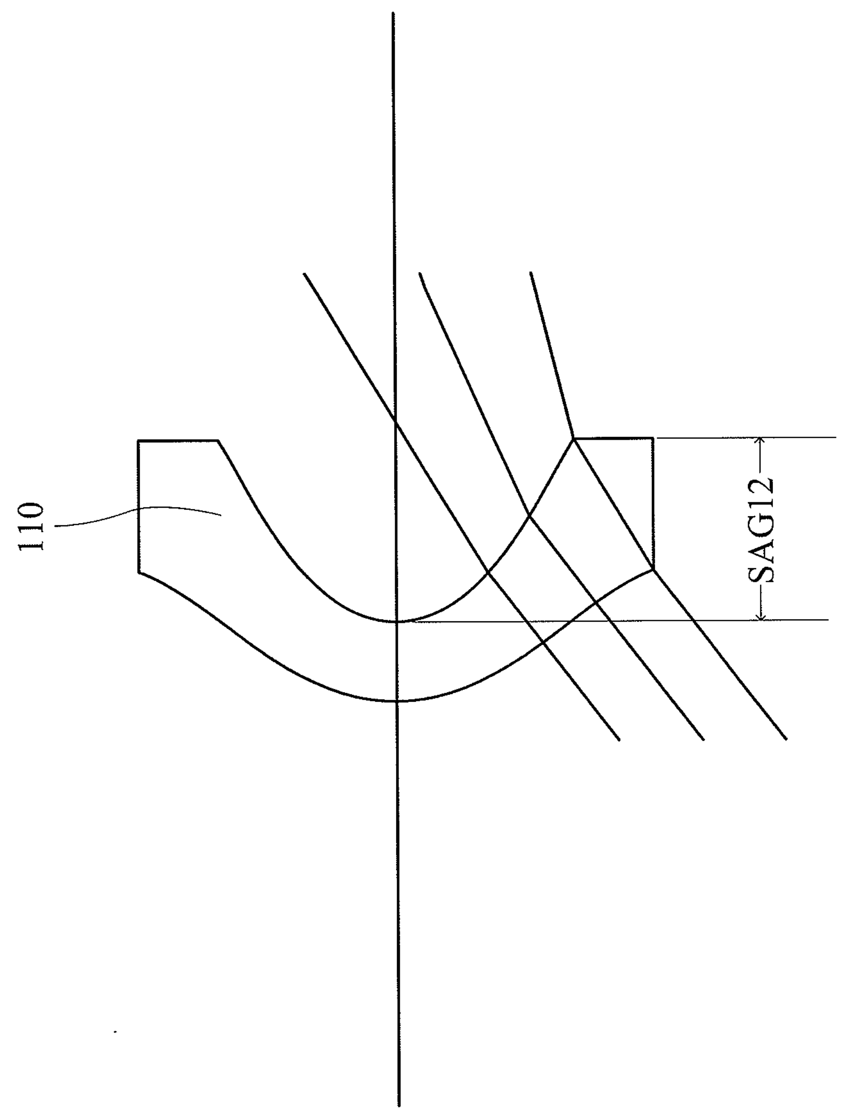
FIG. 6 is a schematic view showing an effective height of an image-side surface of the first lens element of the present invention.

As shown in FIG. 6, when a distance between a position of the largest effective diameter of the image-side surface of the first lens element and a tangent through the vertex on the optical axis of the image-side surface of the first lens element is SAG12 and the central thickness of the first lens element is CT1, satisfying the relationship of 1.5<SAG12/CT1<2.5 can ensure that the shape of the first lens element is not excessively curved. This not only facilitates the production and shaping of the lens element but also helps to reduce the space required to assemble and arrange the lenses in the lens assembly, thus resulting in a more compact arrangement of the lens assembly.

In the optical imaging lens assembly of the present invention, the lens elements may be made of glass or plastic. Having the lens elements made of glass can improve the degree of freedom in configuring the system refractive power of the optical imaging lens assembly; on the other hand, having the lens elements made of plastic can lower the manufacturing cost effectively. Furthermore, an aspheric surface may be disposed on a surface of the lens elements. The aspheric surface can be easily formed into non-spherical shapes to obtain more control variables for mitigating the aberration and consequently reducing the number of the lens elements that are used. As a result, the total length of the system of the optical imaging lens assembly of the present invention can be reduced effectively.

In the optical imaging lens assembly of the present invention, if a lens element has a convex surface, then it means that the surface of the lens element is convex at a paraxial part; on the contrary, if a lens element has a concave surface, then it means that the surface of the lens element is concave at a paraxial part.

In the optical imaging lens assembly of the present invention, at least one stop may be disposed to reduce stray light and help improve the image quality.

Hereinafter, the embodiments of the present invention will be described.

Figure 1B:
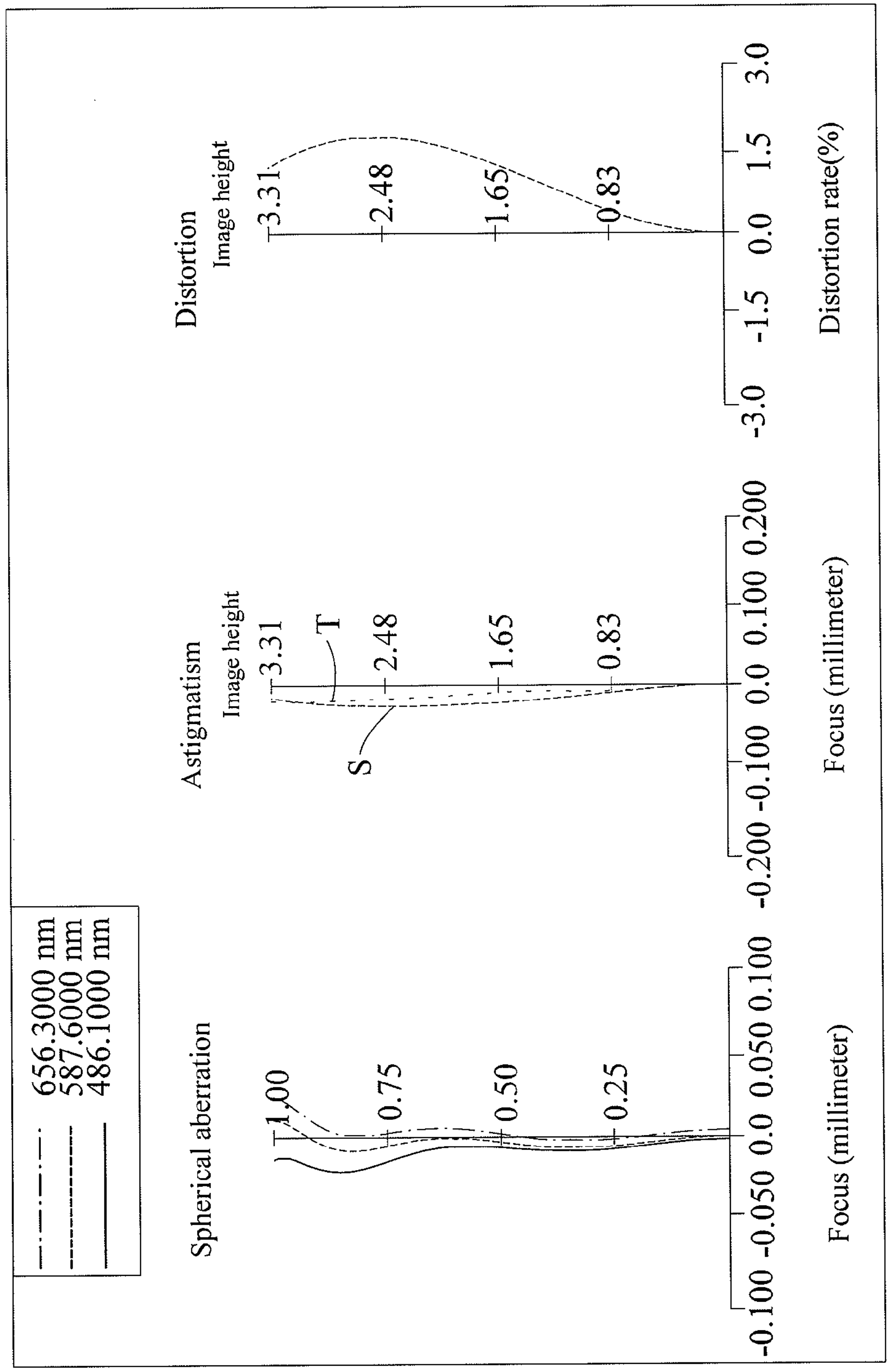
FIG. 1B is a graph of aberration curves according to the first embodiment of the present invention.

FIG. 1A illustrates the first embodiment of the present invention, while FIG. 1B is an aberration graph according to the first embodiment of the present invention. As shown in FIG. 1A, in this embodiment, an optical imaging lens assembly 1 comprises, in order from an object side A to an image side B, a first lens element 110, a second lens element 120, an aperture stop 100, a third lens element 130, a fourth lens element 140, an infrared filter 150, a cover glass 160 and an image plane 170. That is, the infrared filter 150, the cover glass 160 and the image plane 170 are sequentially disposed behind the fourth lens element 140 and corresponding to a position where the image side B is located to receive an image from the optical imaging lens assembly 1. The first lens element 110, the second lens element 120, the third lens element 130 and the fourth lens element 140 are all made of plastic to lower the manufacturing cost; however, the materials of the first lens element 110 and the second lens element 120 are not limited thereto, and those skilled in the art may also adopt glass as a material in other examples.

In detail, in this embodiment, the first lens element 110 with negative refractive power has a convex object-side surface 111 and a concave image-side surface 112. The second lens element 120 has positive refractive power, and both an object-side surface 121 and an image-side surface 122 of the second lens element 120 are convex. The third lens element 130 with negative refractive power has a convex object-side surface 131 and a concave image-side surface 132. The fourth lens element 140 has positive refractive power, and both an object-side surface 141 and an image-side surface 142 of the fourth lens element 140 are convex. In the aforesaid lens elements, all the object-side surfaces and the image-side surfaces are aspheric.

In the first embodiment, a focal length of the optical imaging lens assembly 1 is f, and f=4.28.

In the first embodiment, an f-number of the optical imaging lens assembly 1 is Fno, and Fno=2.45.

In the first embodiment, half of a maximum viewing angle of the optical imaging lens assembly 1 is HFOV, and HFOV=37.5.

In the optical imaging lens assembly 1 of the first embodiment, when a refractive index of the first lens element 110 is N1, a refractive index of the second lens element 120 is N2 and a refractive index of the third lens element 130 is N3; a relationship of $|N2+N3-2N1|=0.10$ exists therebetween.

In the optical imaging lens assembly 1 of the first embodiment, when an Abbe number of the third lens element 130 is V3 and an Abbe number of the fourth lens element 140 is V4, a relationship of $V4-V3=32.40$ exists therebetween.

In the optical imaging lens assembly 1 of the first embodiment, when a thickness (i.e. a central thickness) of the first lens element 110 is CT1 and a thickness (i.e. a central thickness) of the fourth lens element 140 is CT4; a relationship of $CT4/CT1=0.81$ exists between.

In the optical imaging lens assembly 1 of the first embodiment, when a distance on the optical axis between the third lens element 130 and the fourth lens element 140 is T34 and the focal length of the optical imaging lens assembly 1 is f; a relationship of $(T34/f)*100=3.74$ exists therebetween.

In the optical imaging lens assembly 1 of the first embodiment, when a curvature radius of the object-side surface 111 of the first lens element 110 is R1 and a curvature radius of the image-side surface 112 of the first lens element 110 is R2, a relationship of $(R1+R2)/(R1-R2)=3.19$ exists therebetween.

In the optical imaging lens assembly 1 of the first embodiment, when a curvature radius of the object-side surface 121 of the second lens element 120 is R3 and a curvature radius of the image-side surface 122 of the second lens element 120 is R4, a relationship of $R3/R4=-0.39$ exists therebetween.

In the optical imaging lens assembly 1 of the first embodiment, when a curvature radius of the object-side surface 131 of the third lens element 130 is R5 and a curvature radius of the image-side surface 132 of the third lens element 130 is R6, a relation of $R6/R5=0.13$ exists therebetween.

In the optical imaging lens assembly 1 of the first embodiment, when the focal length is f and a focal length of the second lens element 120 is f2, a relationship of $f/f2=1.14$ exists therebetween.

In the optical imaging lens assembly 1 of the first embodiment, when the central thickness of the first lens element 110 is CT1 and a distance between an position of the largest effective diameter of the image-side surface 112 of the first lens element 110 and a tangent through the vertex on the optical axis of the image-side surface of the first lens element 110 is SAG12, a relationship of $SAG12/CT1=2.29$ exists therebetween.

In the optical imaging lens assembly 1 of the first embodiment, when a distance between the object-side surface 111 of the first lens element 110 and the object-side surface 121 of the second lens element 120 is Dr1*r*3 and a distance between the object-side surface 121 of the second lens element 120 and the image-side surface 142 of the fourth lens element 140 is Dr3*r*8, a relationship of $Dr1r3/Dr3r8=1.62$ exists therebetween.

In the optical imaging lens assembly 1 of the first embodiment, when an axial distance between the aperture stop 100 and the image plane 170 is SL and an axial distance from the object-side surface 111 of the first lens element 110 and the image plane 170 is TTL, a relationship of $SL/TTL=0.52$ exists therebetween.

The optical imaging lens assembly 1 of the first embodiment further comprises an image sensor at the image plane. When half of a diagonal length of an effective photosensitive area of the image sensor is Imgh, and the focal length of the optical imaging lens assembly 1 is f; a relationship of Imgh/f=0.77 exists therebetween.

In the optical imaging lens assembly 1 of the first embodiment, when the distance on the optical axis between the object-side surface 111 of the first lens element 110 and the image plane 170 is TTL and the half of the diagonal length of the effective photosensitive area of the image sensor of the optical imaging lens assembly 1 is Imgh, a relationship of TTL/Imgh=3.90 exists therebetween.

Figure 2A:
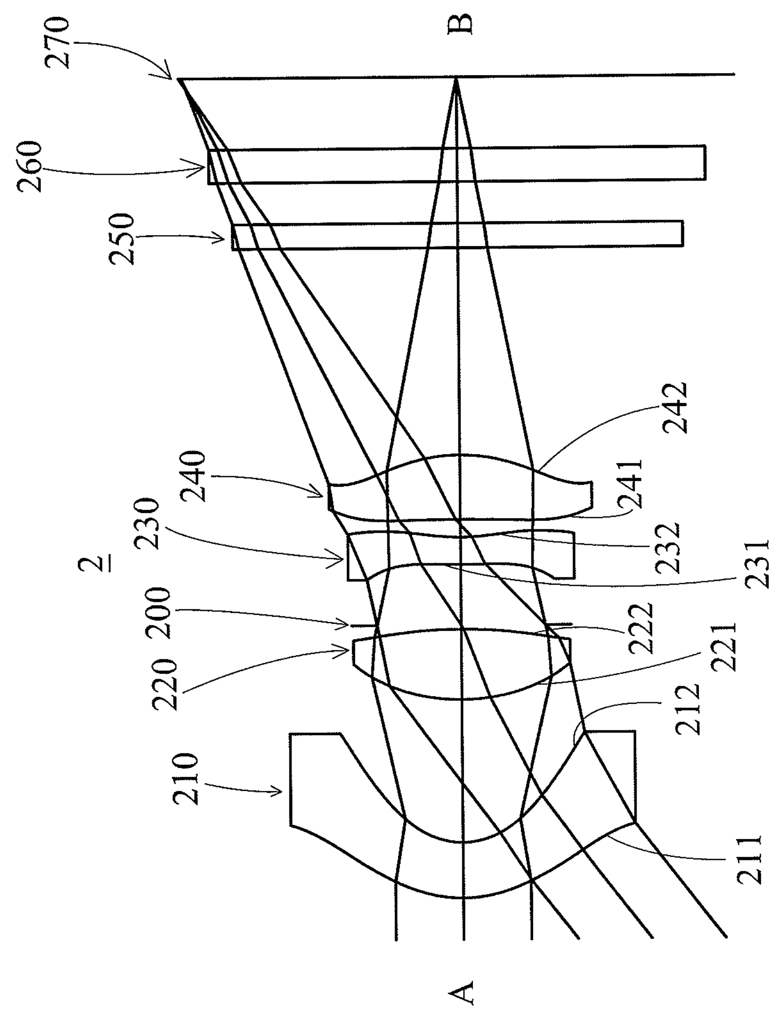
FIG. 2A is a schematic view of an optical imaging lens assembly according to the second embodiment of the present invention.
Figure 2B:
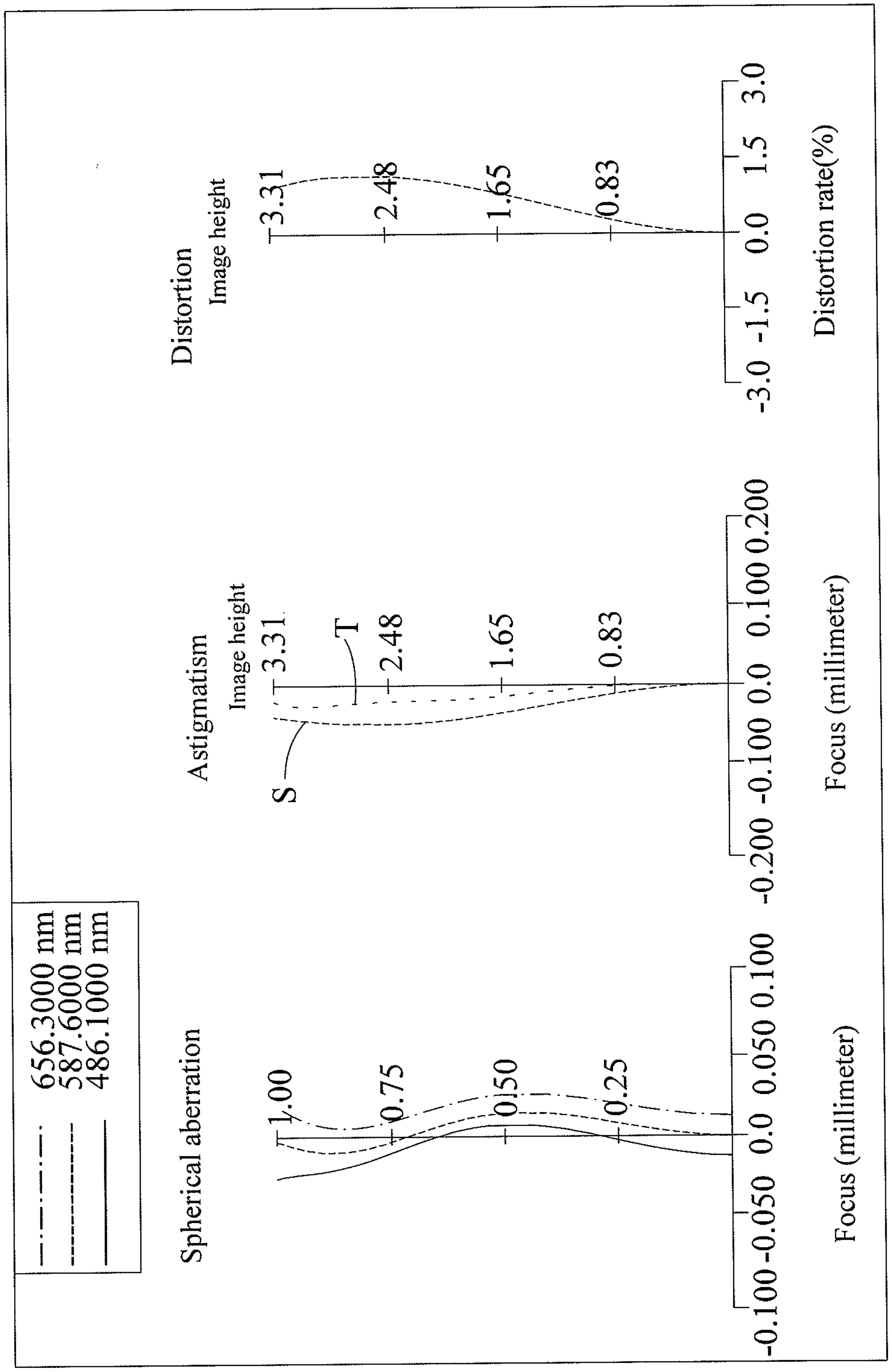
FIG. 2B is a graph of aberration curves according to the second embodiment of the present invention.

FIG. 2A illustrates the second embodiment of the present invention, while FIG. 2B is an aberration graph according to the second embodiment of the present invention. As shown in FIG. 2A, similar to the first embodiment, an optical imaging lens assembly 2 of this embodiment also comprises such optical elements as a first lens element 210, a second lens element 220, a third lens element 230, a fourth lens element 240, an aperture stop 200, an infrared filter 250, a cover glass 260 and an image plane 270. In this embodiment, the first lens element 210 with negative refractive power has a convex object-side surface 211 and a concave image-side surface 212. The second lens element 220 has positive refractive power, and both an object-side surface 221 and an image-side surface 222 of the second lens element 220 are convex. The third lens element 230 with negative refractive power has a convex object-side surface 231 and a concave image-side surface 232. The fourth lens element 240 with positive refractive power has a concave object-side surface 241 and a convex image-side surface 242. In the aforesaid lens elements, all the object-side surfaces and the image-side surfaces are aspheric.

In the second embodiment, a focal length of the optical imaging lens assembly 2 is f, and f=4.26.

In the second embodiment, an f-number of the optical imaging lens assembly 2 is Fno, and Fno=2.60.

In the second embodiment, half of a maximum viewing angle of the optical imaging lens assembly 2 is HFOV, and HFOV=37.7.

In the optical imaging lens assembly 2 of the second embodiment, when a refractive index of the first lens element 210 is N1, a refractive index of the second lens element 220 is N2 and a refractive index of the third lens element 230 is N3, a relationship of |N2+N3−2N1|=0.11 exists therebetween.

In the optical imaging lens assembly 2 of the second embodiment, when an Abbe number of the third lens element 230 is V3 and an Abbe number of the fourth lens element 240 is V4, a relationship of V4−V3=34.40 exists therebetween.

In the optical imaging lens assembly 2 of the second embodiment, when a thickness (i.e. a central thickness) of the first lens element 210 is CT1 and a thickness (i.e. a central thickness) of the fourth lens element 240 is CT4, a relationship of CT4/CT1=0.17 exists between.

In the optical imaging lens assembly 2 of the second embodiment, when a distance on the optical axis between the third lens element 230 and the fourth lens element 240 is T34 and the focal length of the optical imaging lens assembly 2 is f, a relationship of (T34/f)*100=5.07 exists therebetween.

In the optical imaging lens assembly 2 of the second embodiment, when a curvature radius of the object-side surface 211 of the first lens element 210 is R1 and a curvature radius of the image-side surface 212 of the first lens element 210 is R2, a relationship of (R1+R2)/(R1−R2)=3.24 exists therebetween.

In the optical imaging lens assembly 2 of the second embodiment, when a curvature radius of the object-side surface 221 of the second lens element 220 is R3 and a curvature radius of the image-side surface 222 of the second lens element 220 is R4, a relationship of R3/R4=−0.41 exists therebetween.

In the optical imaging lens assembly 2 of the second embodiment, when a curvature radius of the object-side surface 231 of the third lens element 230 is R5 and a curvature radius of the image-side surface 232 of the third lens element 230 is R6, a relationship of R6/R5=0.35 exists therebetween.

In the optical imaging lens assembly 2 of the second embodiment, when the focal length is f and the focal length of the second lens element 220 is f2, a relationship of f/f2=1.27 exists therebetween.

In the optical imaging lens assembly 2 of the second embodiment, when the central thickness of the first lens element 210 is CT1 and a distance between a position of the largest effective diameter of the image-side surface 212 of the first lens element 210 and a tangent through the vertex on the optical axis of the image-side surface of the first lens element 210 is SAG12; a relationship of SAG12/CT1=1.99 exists therebetween.

In the optical imaging lens assembly 2 of the second embodiment, when a distance between the object-side surface 211 of the first lens element 210 and the object-side surface 221 of the second lens element 220 is Dr1*r*3 and a distance between the object-side surface 221 of the second lens element 220 and the image-side surface 242 of the fourth lens element 240 is Dr3*r*8, a relationship of Dr1*r*3/Dr3*r*8=0.81 exists therebetween.

In the optical imaging lens assembly 2 of the second embodiment, when an axial distance between the aperture stop 200 and the image plane 270 is SL and an axial distance from the object-side surface 211 of the first lens element 210 and the image plane 270 is TTL, a relationship of SL/TTL=0.66 exists therebetween.

The optical imaging lens assembly 2 of the second embodiment further comprises an image sensor at the image plane. When half of a diagonal length of an effective photosensitive area of the image sensor is Imgh, and the focal length of the optical imaging lens assembly 2 is f; a relationship of Imgh/f=0.78 exists therebetween.

In the optical imaging lens assembly 2 of the second embodiment, when the distance on the optical axis between the object-side surface 211 of the first lens element 210 and the image plane 270 is TTL and the half of the diagonal length of the effective photosensitive area of the image sensor of the optical imaging lens assembly 2 is Imgh, a relationship of TTL/Imgh=2.93 exists therebetween.

Figure 3A:
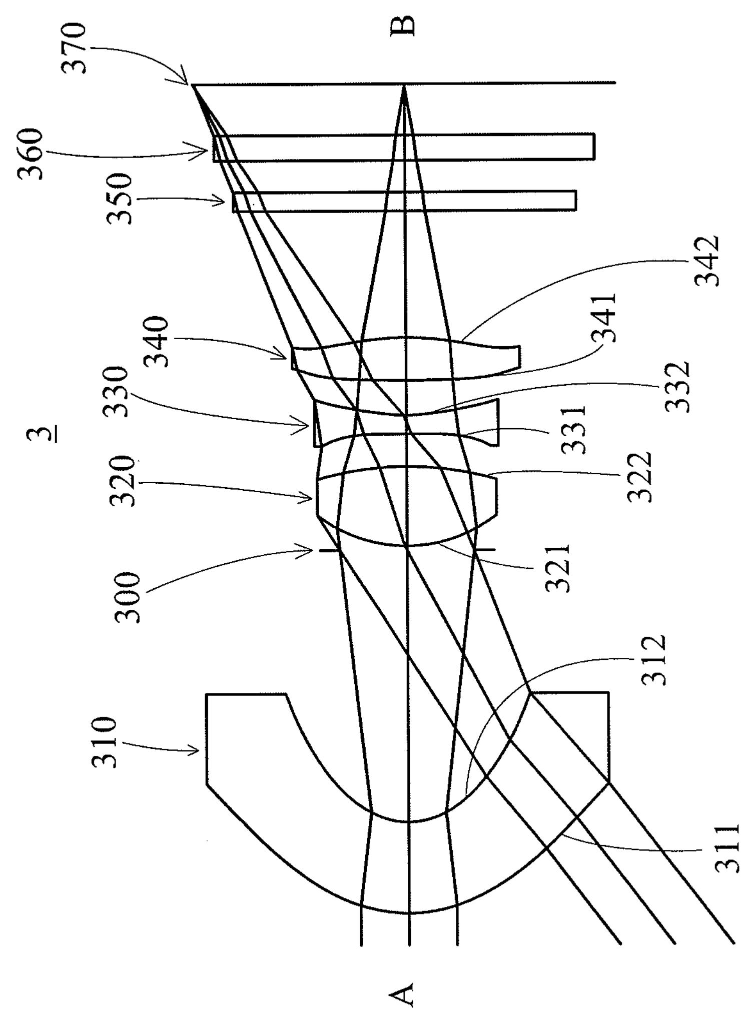
FIG. 3A is a schematic view of an optical imaging lens assembly according to the third embodiment of the present invention.
Figure 3B:
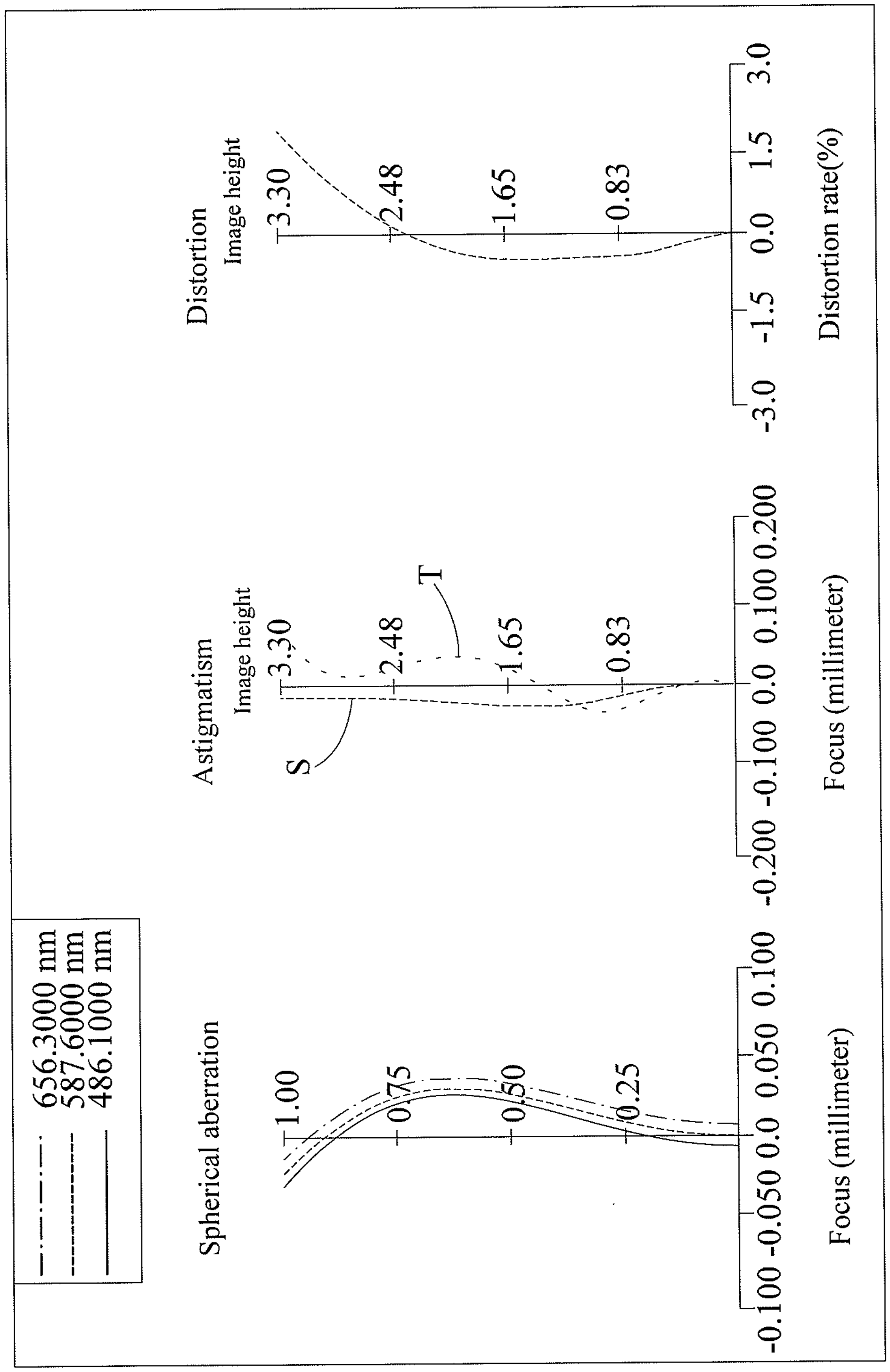
FIG. 3B is a graph of aberration curves according to the third embodiment of the present invention.

FIG. 3A illustrates the third embodiment of the present invention, and FIG. 3B is an aberration graph according to the third embodiment of the present invention. As shown in FIG. 3A, similar to the second embodiment, an optical imaging lens assembly 3 of this embodiment also comprises such optical elements as a first lens element 310, a second lens element 320, a third lens element 330, a fourth lens element 340, an aperture stop 300, an infrared filter 350, a cover glass 360 and an image plane 370. The first lens element 310 with negative refractive power has a convex object-side surface 311 and a concave image-side surface 312. The second lens element 320 has positive refractive power, and both an object-side surface 321 and an image-side surface 322 of the second lens element 320 are convex. The third lens element 330 with negative refractive power has a convex object-side surface 331 and a concave image-side surface 332. The fourth lens element 340 has positive refractive power, and both an object-side surface 341 and an image-side surface 342 of the fourth lens element 340 are convex. All the object-side surfaces and the image-side surfaces of the aforesaid lens elements are aspheric. The third embodiment differs from the first embodiment mainly in that: as being disposed between the first lens element 310 and the second lens element 320, the aperture stop 300 is nearer to the object side A that will be used when shooting a picture, so the total optical length of the optical imaging lens assembly 3 is reduced effectively.

In the third embodiment, a focal length of the optical imaging lens assembly 3 is f, and f=4.24.

In the third embodiment, an f-number of the optical imaging lens assembly 3 is Fno, and Fno=2.80.

In the third embodiment, half of a maximum viewing angle of the optical imaging lens assembly 3 is HFOV, and HFOV=37.5.

In the optical imaging lens assembly 3 of the third embodiment, when a refractive index of the first lens element 310 is N1, a refractive index of the second lens element 320 is N2 and a refractive index of the third lens element 330 is N3, a relationship of $|N2+N3-2N1|=0.09$ exists therebetween.

In the optical imaging lens assembly 3 of the third embodiment, when an Abbe number of the third lens element 330 is V3 and an Abbe number of the fourth lens element 340 is V4, a relationship of $V4-V3=32.40$ exists therebetween.

In the optical imaging lens assembly 3 of the third embodiment, when a thickness (i.e. a central thickness) of the first lens element 310 is CT1 and a thickness (i.e. a central thickness) of the fourth lens element 340 is CT4, a relationship of $CT4/CT1=0.47$ exists between.

In the optical imaging lens assembly 3 of the third embodiment, when a distance on the optical axis between the third lens element 330 and the fourth lens element 340 is T34 and the focal length of the optical imaging lens assembly 3 is f, a relationship of $(T34/f)*100=12.97$ exists therebetween.

In the optical imaging lens assembly 3 of the third embodiment, when a curvature radius of the object-side surface 311 of the first lens element 310 is R1 and a curvature radius of the image-side surface 312 of the first lens element 310 is R2, a relationship of $(R1+R2)/(R1-R2)=2.95$ exists therebetween.

In the optical imaging lens assembly 3 of the third embodiment, when a curvature radius of the object-side surface 321 of the second lens element 320 is R3 and a curvature radius of the image-side surface 322 of the second lens element 320 is R4, a relationship of $R3/R4=-0.46$ exists therebetween.

In the optical imaging lens assembly 3 of the third embodiment, when a curvature radius of the object-side surface 331 of the third lens element 330 is R5 and a curvature radius of the image-side surface 332 of the third lens element 330 is R6, a relationship of $R6/R5=0.20$ exists therebetween.

In the optical imaging lens assembly 3 of the third embodiment, when the focal length is f and a focal length of the second lens element 320 is f2, a relationship of $f/f2=1.33$ exists therebetween.

In the optical imaging lens assembly 3 of the third embodiment, when the central thickness of the first lens element 310 is CT1 and a distance between a position of the largest effective diameter of the image-side surface 312 of the first lens element 310 and a tangent through the vertex on the optical axis of the image-side surface of the first lens element 310 is SAG12, a relationship of $SAG12/CT1=1.42$ exists therebetween.

In the optical imaging lens assembly 3 of the third embodiment, when a distance between the object-side surface 311 of the first lens element 310 and the object-side surface 321 of the second lens element 320 is Dr1r3 and a distance between the object-side surface 321 of the second lens element 320 and the image-side surface 342 of the fourth lens element 340 is Dr3r8, a relationship of $Dr1r3/Dr3r8=1.76$ exists therebetween.

In the optical imaging lens assembly 3 of the third embodiment, when an axial distance between the aperture stop 300 and the image plane 370 is SL and an axial distance from the object-side surface 311 of the first lens element 310 of the optical imaging lens assembly 3 and the image plane 370 is TTL, a relationship of $SL/TTL=0.55$ exists therebetween.

The optical imaging lens assembly 3 of the third embodiment further comprises an image sensor at the image plane. When half of a diagonal length of an effective photosensitive area of the image sensor is Imgh, and the focal length of the optical imaging lens assembly 3 is f; a relationship of $Imgh/f=0.78$ exists therebetween.

In the optical imaging lens assembly 3 of the third embodiment, when the distance on the optical axis between the object-side surface 311 of the first lens element 310 and the image plane 370 is TTL and the half of the diagonal length of the effective photosensitive area of the image sensor of the optical imaging lens assembly 3 is Imgh, a relationship of $TTL/Imgh=3.90$ exists therebetween.

Figure 4A:
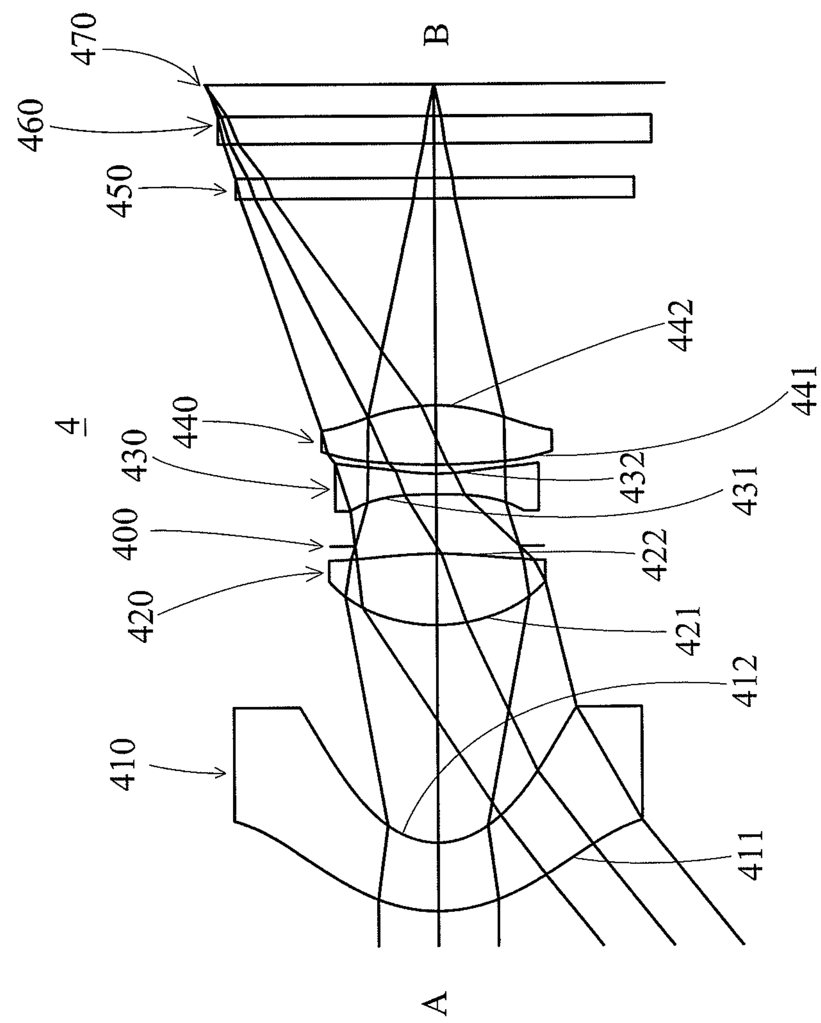
FIG. 4A is a schematic view of an optical imaging lens assembly according to the fourth embodiment of the present invention.
Figure 4B:
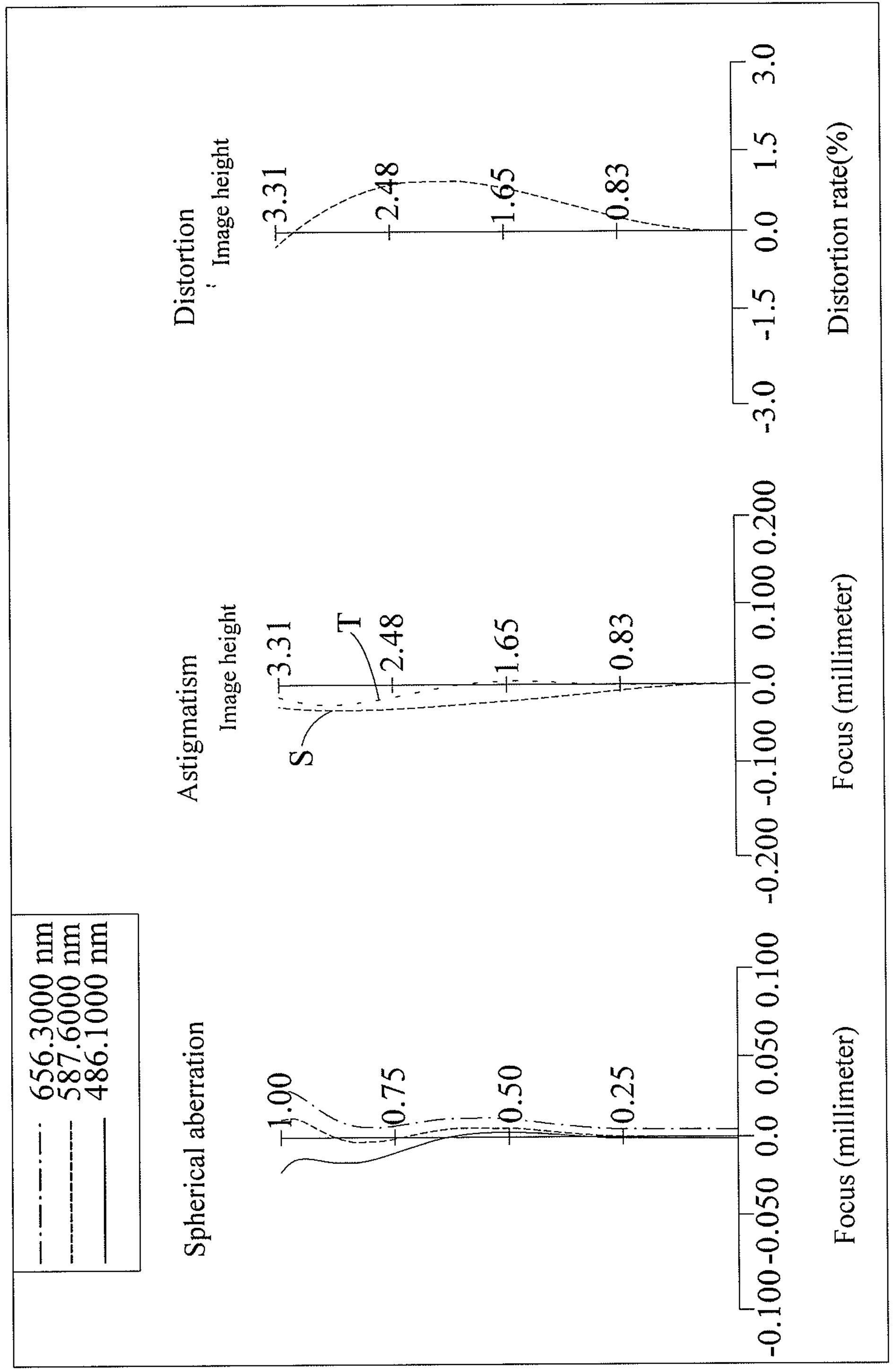
FIG. 4B is a graph of aberration curves according to the fourth embodiment of the present invention.

FIG. 4A illustrates the fourth embodiment of the present invention, while FIG. 4B is an aberration graph according to the fourth embodiment of the present invention. In this embodiment, an optical imaging lens assembly 4 is configured similarly to the optical imaging lens assembly 1 of the first embodiment. As shown in FIG. 4A, the optical imaging lens assembly 4 also comprises such optical elements as a first lens element 410, a second lens element 420, a third lens element 430, a fourth lens element 440, an aperture stop 400, an infrared filter 450, a cover glass 460 and an image plane 470. In this embodiment, the first lens element 410 with negative refractive power has a convex object-side surface 411 and a concave image-side surface 412. The second lens element 420 has positive refractive power, and both an object-side surface 421 and an image-side surface 422 of the second lens element 420 are convex. The third lens element 430 has negative refractive power, and both an object-side surface 431 and an image-side surface 432 of the third lens element 430 are concave. The fourth lens element 440 has positive refractive power, and both an object-side surface 441 and an image-side surface 442 of the fourth lens element 440 are convex. In the aforesaid lens elements, all the object-side surfaces and the image-side surfaces are aspheric.

In the fourth embodiment, a focal length of the optical imaging lens assembly 4 is f, and f=4.16.

In the fourth embodiment, an f-number of the optical imaging lens assembly 4 is Fno, and Fno=2.40.

In the fourth embodiment, half of a maximum viewing angle of the optical imaging lens assembly 4 is HFOV, and HFOV=38.7.

In the optical imaging lens assembly 4 of the fourth embodiment, when a refractive index of the first lens element 410 is N1, a refractive index of the second lens element 420 is N2 and a refractive index of the third lens element 430 is N3, a relationship of $|N2+N3-2N1|=0.12$ exists therebetween.

In the optical imaging lens assembly 4 of the fourth embodiment, when an Abbe number of the third lens element 430 is V3 and an Abbe number of the fourth lens element 440 is V4, a relationship of $V4-V3=32.10$ exists therebetween.

In the optical imaging lens assembly 4 of the fourth embodiment, when a thickness (i.e. a central thickness) of the first lens element 410 is CT1 and a thickness (i.e. a central thickness) of the fourth lens element 440 is CT4, a relationship of $CT4/CT1=0.87$ exists between.

In the optical imaging lens assembly 4 of the fourth embodiment, when a distance on the optical axis between the third lens element 430 and the fourth lens element 440 is T34 and the focal length of the optical imaging lens assembly 4 is f, a relationship of $(T34/f)*100=3.20$ exists therebetween.

In the optical imaging lens assembly 4 of the fourth embodiment, when a curvature radius of the object-side surface 411 of the first lens element 410 is R1 and a curvature radius of the image-side surface 412 of the first lens element 410 is R2, a relationship of (R1+R2)/(R1−R2)=2.93 exists therebetween.

In the optical imaging lens assembly 4 of the fourth embodiment, when a curvature radius of the object-side surface 421 of the second lens element 420 is R3 and a curvature radius of the image-side surface 422 of the second lens element 420 is R4, a relationship of R3/R4=−0.35 exists therebetween.

In the optical imaging lens assembly 4 of the fourth embodiment, when a curvature radius of the object-side surface 431 of the third lens element 430 is R5 and a curvature radius of the image-side surface 432 of the third lens element 430 is R6, a relationship of R6/R5=−0.12 exists therebetween.

In the optical imaging lens assembly 4 of the fourth embodiment, when the focal length is f and a focal length of the second lens element 420 is f2, a relationship of f/f2=1.19 exists therebetween.

In the optical imaging lens assembly 4 of the fourth embodiment, when the central thickness of the first lens element 410 is CT1 and a distance between a position of the largest effective diameter of the image-side surface 412 of the first lens element 410 and a tangent through the vertex on the optical axis of the image-side surface of the first lens element 410 is SAG12, a relationship of SAG12/CT1=1.98 exists therebetween.

In the optical imaging lens assembly 4 of the fourth embodiment, when a distance between the object-side surface 411 of the first lens element 410 and the object-side surface 421 of the second lens element 420 is Dr1*r*3 and a distance between the object-side surface 421 of the second lens element 420 and the image-side surface 442 of the fourth lens element 440 is Dr3*r*8, a relationship of Dr1*r*3/Dr3*r*8=1.30 exists therebetween.

In the optical imaging lens assembly 4 of the fourth embodiment, when an axial distance between the aperture stop 400 and the image plane 470 is SL and an axial distance from the object-side surface 411 of the first lens element 410 of the optical imaging lens assembly 4 and the image plane 470 is TTL, a relationship of SL/TTL=0.55 exists therebetween.

The optical imaging lens assembly 4 of the fourth embodiment further comprises an image sensor at the image plane. When half of a diagonal length of an effective photosensitive area of the image sensor is Imgh, the focal length of the optical imaging lens assembly 4 is f; a relationship of Imgh/f==0.79 exists therebetween.

In the optical imaging lens assembly 4 of the fourth embodiment, when the distance on the optical axis between the object-side surface 411 of the first lens element 410 and the image plane 470 is TTL and the half of the diagonal length of the effective photosensitive area of the image sensor of the optical imaging lens assembly 4 is Imgh, a relationship of TTL/Imgh=3.56 exists therebetween.

Figure 5A:
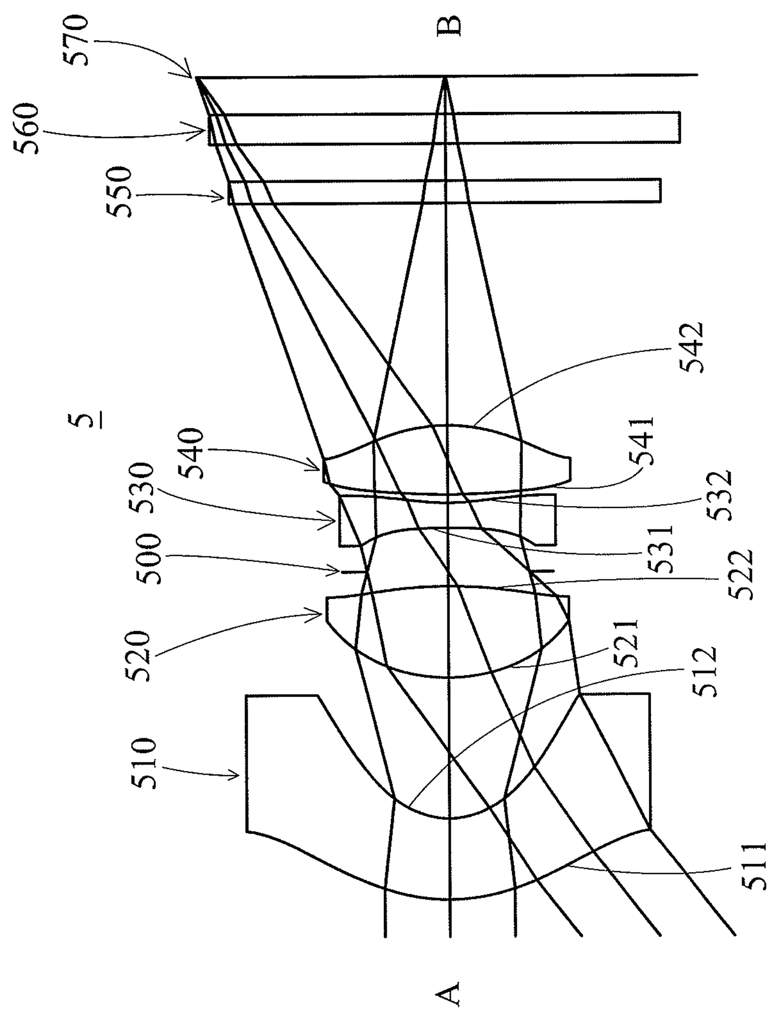
FIG. 5A is a schematic view of an optical imaging lens assembly according to the fifth embodiment of the present invention.
Figure 5B:
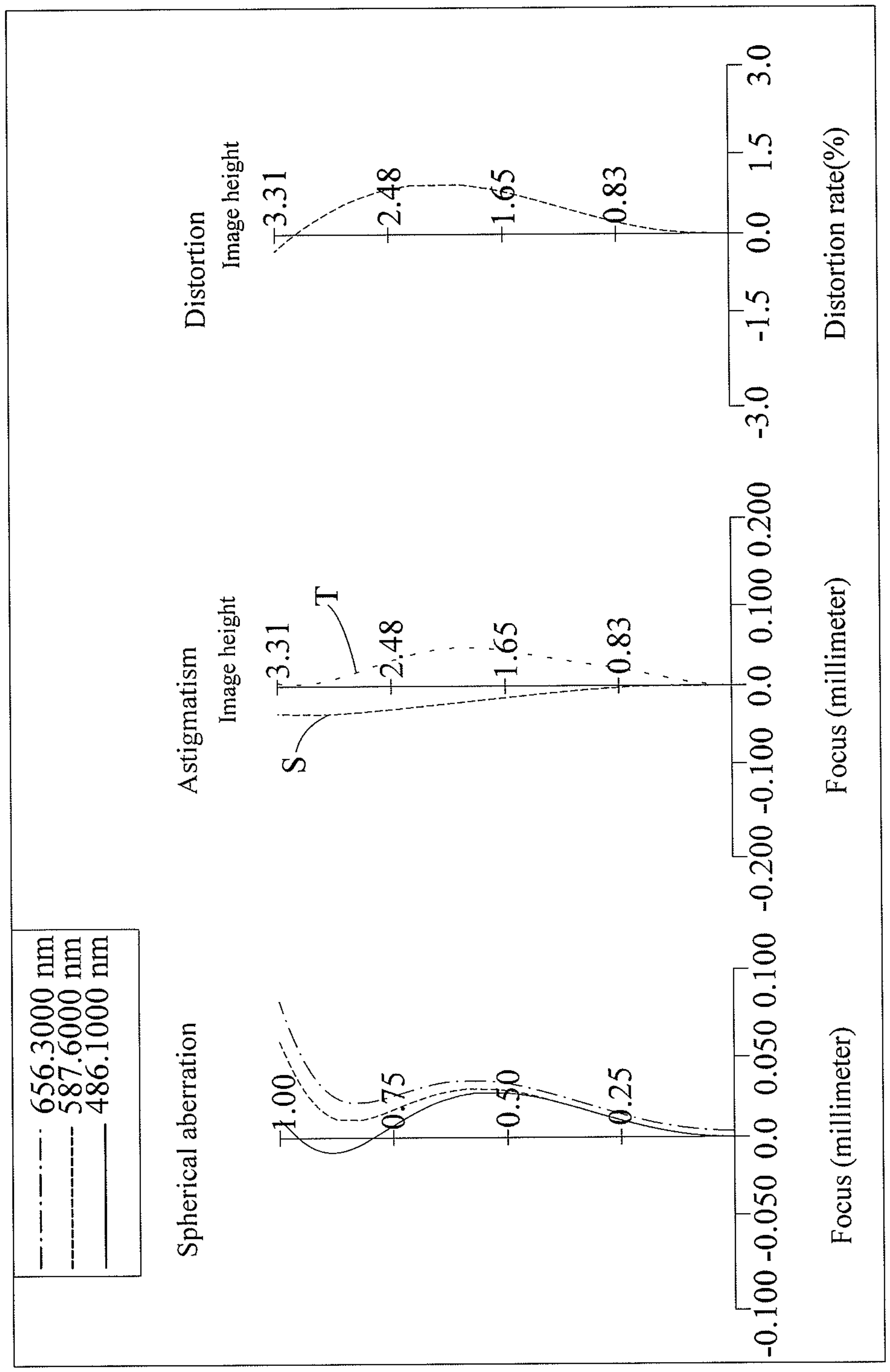
FIG. 5B is a graph of aberration curves according to the fifth embodiment of the present invention.

FIG. 5A illustrates the fifth embodiment of the present invention, and FIG. 5B is an aberration graph according to the fifth embodiment of the present invention. In this embodiment, an optical imaging lens assembly 5 is configured similarly to the optical imaging lens assembly 4 of the fourth embodiment. As shown in FIG. 5A, the optical imaging lens assembly 5 also comprises such optical elements as a first lens element 510, a second lens element 520, a third lens element 530, a fourth lens element 540, an aperture stop 500, an infrared filter 550, a cover glass 560 and an image plane 570. The first lens element 510 with negative refractive power has a convex object-side surface 511 and a concave image-side surface 512. The second lens element 520 has positive refractive power, and both an object-side surface 521 and an image-side surface 522 of the second lens element 520 are convex. The third lens element 530 has negative refractive power, and both an object-side surface 531 and image-side surface 532 of the third lens element 530 are concave. The fourth lens element 340 has positive refractive power, and both an object-side surface 541 and an image-side surface 542 of the fourth lens element 540 are convex. In the aforesaid lens elements, all the object-side surfaces and the image-side surfaces are aspheric. The fifth embodiment differs from the fourth embodiment mainly in that in the fifth embodiment, the thickness on an optical axis of the first lens element 510 is slightly larger than that of the first lens element 410 in the fourth embodiment, thereby, effectively reducing the distortion rate of the image.

In the fifth embodiment, a focal length of the optical imaging lens assembly 5 is f, and f=4.23.

In the fifth embodiment, an f-number of the optical imaging lens assembly 5 is Fno, and Fno=2.40.

In the fifth embodiment, half of a maximum viewing angle of the optical imaging lens assembly 5 is HFOV, and HFOV=38.2.

In the optical imaging lens assembly 5 of the fifth embodiment, when a refractive index of the first lens element 510 is N1, a refractive index of the second lens element 520 is N2 and a refractive index of the third lens element 530 is N3, a relationship of |N2+N3−2N1|=0.12 exists therebetween.

In the optical imaging lens assembly 5 of the fifth embodiment, when an Abbe number of the third lens element 530 is V3 and an Abbe number of the fourth lens element 540 is V4, a relation of V4−V3=32.10 exists therebetween.

In the optical imaging lens assembly 5 of the fifth embodiment, when a thickness (i.e. a central thickness) of the first lens element 510 is CT1 and a thickness (i.e. a central thickness) of the fourth lens element 540 is CT4, a relationship of CT4/CT1=0.86 exists between.

In the optical imaging lens assembly 5 of the fifth embodiment, when a distance on the optical axis between the third lens element 530 and the fourth lens element 540 is T34 and the focal length of the optical imaging lens assembly 5 is f, a relation of (T34/f)*100=2.72 exists therebetween.

In the optical imaging lens assembly 5 of the fifth embodiment, when a curvature radius of the object-side surface 511 of the first lens element 510 is R1 and a curvature radius of the image-side surface 512 of the first lens element 510 is R2, a relation of (R1+R2)/(R1−R2)=2.40 exists therebetween.

In the optical imaging lens assembly 5 of the fifth embodiment, when a curvature radius of the object-side surface 521 of the second lens element 520 is R3 and a curvature radius of the image-side surface 522 of the second lens element 520 is R4, a relationship of R3/R4=−0.42 exists therebetween.

In the optical imaging lens assembly 5 of the fifth embodiment, when a curvature radius of the object-side surface 531 of the third lens element 530 is R5 and a curvature radius of the image-side surface 532 of the third lens element 530 is R6, a relationship of R6/R5=−0.13 exists therebetween.

In the optical imaging lens assembly 5 of the fifth embodiment, when the focal length is f and a focal length of the second lens element 520 is f2, a relationship of f/f2=1.31 exists therebetween.

In the optical imaging lens assembly 5 of the fifth embodiment, when the central thickness of the first lens element 510 is CT1 and a distance between a position of the largest effective diameter of the image-side surface 512 of the first lens element 510 and a tangent through the vertex on the optical axis of the image-side surface of the first lens element 510 is SAG12, a relationship of SAG12/CT1=1.53 exists therebetween.

In the optical imaging lens assembly 5 of the fifth embodiment, when a distance between the object-side surface 511 of the first lens element 510 and the object-side surface 521 of the second lens element 520 is Dr1*r*3 and a distance between the object-side surface 521 of the second lens element 520 and the image-side surface 542 of the fourth lens element 540 is Dr3r8, a relationship of Dr1r3/Dr3r8=0.88 exists therebetween.

In the optical imaging lens assembly 5 of the fifth embodiment, when an axial distance between the aperture stop 500 and the image plane 570 is SL and an axial distance from the object-side surface 511 of the first lens element 510 of the optical imaging lens assembly 5 and the image plane 570 is TTL, a relationship of SUTTL=0.59 exists therebetween.

The optical imaging lens assembly 5 of the fifth embodiment further comprises an image sensor at the image plane. When half of a diagonal length of an effective photosensitive area of the image sensor is Imgh, the focal length of the optical imaging lens assembly 5 is f, and a relationship of Imgh/f=0.78 exists therebetween.

In the optical imaging lens assembly 5 of the fifth embodiment, when the distance on the optical axis between the object-side surface 511 of the first lens element 510 and the image plane 570 is TTL and the half of the diagonal length of the effective photosensitive area of the image sensor of the optical imaging lens assembly 5 is Imgh, a relationship of TTL/Imgh=3.29 exists therebetween.

It shall be particularly appreciated that in the aforesaid embodiments, all the object-side surfaces and the image-side surfaces of the lens elements are aspheric; however, in other examples, those skilled in the art may also achieve the objective of the present invention on the basis of the following principles: (1) either the object-side surface or the image-side surface of the third lens element should at least be aspheric; and (2) either the object-side surface or the image-side surface of the fourth lens element should at least be aspheric.

As described in the above embodiments, one of the important technical features of the present invention lie in the design of the refractive power of the lens elements, and this can improve the optical performance of the optical imaging lens assembly significantly. In detail, the first lens element with negative refractive power can be used to widen the field angle of the optical imaging lens assembly. The second lens element with positive refractive power mainly acts to provide most of the refractive power of the optical imaging lens assembly, and contributes to the reduction of the total optical length of the optical imaging lens assembly. The third lens element with negative refractive power acts in the present invention just as a compensating lens element, which can be used to balance and correct the aberration generated by the optical imaging lens assembly. The fourth lens element with positive refractive power can effectively distribute the positive refractive power of the second lens element to reduce the sensitivity of the system as a whole. Furthermore, because the third lens element has negative refractive power and the fourth lens element has positive refractive power in the present invention, coma aberration can be corrected effectively and undue increase of other aberrations can also be prevented.

According to the arrangements disclosed in the first to the fifth embodiments, an exit pupil of the optical imaging lens assembly can be arranged to be far away from the image plane, so light is incident on the photosensitive element (not shown) in an almost perpendicular way, which is called the telecentric characteristic of the image side B. The telecentric characteristic is extremely important for the photosensitive capability of a solid-state image sensor because it can improve the photosensitivity of the image sensor and reduce the possibility of occurrence of vignetting in the system. Furthermore, the fourth lens element may further have at least one inflection point (not shown) disposed thereon to effectively suppress an angle at which light from an off-axis field is incident on the photosensitive element and to further correct the aberration of the off-axis field. On the other hand, arranging the aperture stop to be closer to the third lens element can contribute to a wider field angle, help correct distortion and chromatic aberration of the magnification and effectively reduce the sensitivity of the optical imaging lens assembly. Therefore, in the optical imaging lens assembly of the present invention, the aperture stop is disposed between the first lens element and the third lens element with the intention to gain balance between the telecentric characteristic and the wide field angle.

Furthermore, Table 1, Table 3, Table 5, Table 7 and Table 9 attached herein are lists showing the parameters of the first lens element, the second lens element, the third lens element, the fourth lens element, the aperture stop, the infrared filter, the cover glass and the image plane in the first to the fifth embodiments of the present invention respectively. Surface #0, surface #1, surface #2, . . . , surface #14 represent reference numbers of the individual elements (or surfaces thereof) in order from the object side A to the image side B respectively. For example, in Table 1, the surface #1 represents the object-side surface of the first lens element 110, the surface #2 represents the image-side surface of the first lens element 110, and so on.

Table 2, Table 4, Table 6, Table 8 and Table 10 attached herein are aspheric coefficients of the surfaces listed in Table 1, Table 3, Table 5, Table 7 and Table 9 respectively, wherein the aspheric coefficients are represented by A4, A6, A8, . . . , A16 respectively. The equation for an aspheric curve of the optical imaging lens assembly is as follows:

$$(X)Y = (Y^2/R)\Big/\left(l + (1-(1+k)*(Y/R)^2)^{1/2}\right) + \sum_i (Ai)*(Y^i)$$

X: the relative height between the point on the aspheric surface, which has a distance Y from the optical axis, and the tangent plane to the aspheric surface at the top vertex on the optical axis;

Y: the distance between a point on the aspheric curve and the optical axis;

R: a paraxial curvature radius;

k: a conical coefficient;

Ai: an aspheric coefficient of an $i^{th}$ order.

In reference to Table 1, Table 3, Table 5, Table 7 and Table 9, associated relationships among the curvature radii, the thicknesses, the refractive indices, the Abbe numbers and the focal lengths of the optical elements including the first lens element, the second lens element, the third lens element and the fourth lens element are defined therein to assist in achieving the objective of the present invention.

The relationship of the numerical values of the curvature radii, the thicknesses, the refractive indices, the Abbe numbers and the focal lengths described in the first to the fifth embodiments are listed in Table 11.

According to the above descriptions, by defining the first lens element with negative refractive power, the second lens element with positive refractive power, the third lens element with negative refractive power and the fourth lens element with positive refractive power and by further defining relationships among the numerical values of the curvature radii, thicknesses, the refractive indices, the Abbe numbers and the focal lengths of the lens elements, an optical imaging lens assembly, which has improved optical characteristics, a wide viewing angle, superior imaging quality and a shorter total length of the lenses, can be obtained.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

TABLE 1

| (Embodiment 1) f(focal length) = 4.28 mm, Fno = 2.45, HFOV(Half of Field of View) = 37.5 deg. | | | | | | | |
|---|---|---|---|---|---|---|---|
| Surface# | | Curvature Radius | Thickness | Material | Index | Abbe# | Focal length |
| 0 | Object | Plano | Infinity | | | | |
| 1 | Lens 1 | 2.16370 (ASP) | 0.992 | Plastic | 1.530 | 55.8 | −6.70 |
| 2 | | 1.13075 (ASP) | 4.145 | | | | |
| 3 | Lens 2 | 2.66454 (ASP) | 1.005 | Plastic | 1.530 | 55.8 | 3.75 |
| 4 | | −6.77140 (ASP) | 0.093 | | | | |
| 5 | Ape. Stop | Plano | 0.782 | | | | |
| 6 | Lens 3 | 17.47180 (ASP) | 0.317 | Plastic | 1.632 | 23.4 | −4.02 |
| 7 | | 2.20270 (ASP) | 0.160 | | | | |
| 8 | Lens 4 | 8.27920 (ASP) | 0.807 | Plastic | 1.530 | 55.8 | 4.27 |
| 9 | | −3.01330 (ASP) | 3.000 | | | | |
| 10 | IR-filter | Plano | 0.300 | Glass | 1.517 | 64.2 | — |
| 11 | | Plano | 0.500 | | | | |
| 12 | Cover-glass | Plano | 0.400 | Glass | 1.517 | 64.2 | — |
| 13 | | Plano | 0.603 | | | | |
| 14 | Image | Plano | — | | | | |

Note:
Reference wavelength is d-line 587.6 nm
ASP stands for aspherical surface

TABLE 2

| Aspheric Coefficients | | | | |
|---|---|---|---|---|
| Surface# | 1 | 2 | 3 | 4 |
| k = | −2.43102E+00 | −1.09749E+00 | −1.25703E+00 | −3.92373E−01 |
| A4 = | 1.74779E−02 | 2.95326E−02 | 1.20170E−02 | 4.81412E−03 |
| A6 = | −3.02481E−03 | 3.68437E−04 | 2.00949E−03 | 4.97586E−03 |
| A8 = | 1.81707E−04 | −2.14703E−03 | −5.75803E−04 | −2.95555E−03 |
| A10 = | −4.60041E−06 | 6.86435E−04 | 9.87197E−04 | 1.15838E−03 |
| A12 = | 3.81796E−09 | −1.19256E−04 | −6.72827E−04 | −5.32378E−05 |
| A14 = | | 7.34067E−06 | 2.44220E−04 | −6.53620E−05 |
| A16 = | | | −3.06762E−05 | 1.09514E−05 |

TABLE 2-continued

| Aspheric Coefficients | | | | |
|---|---|---|---|---|
| Surface# | 6 | 7 | 8 | 9 |
| k = | −1.00000E+00 | −9.84420E+00 | −1.00000E+00 | −7.45177E−01 |
| A4 = | −1.56046E−01 | −7.41998E−02 | −5.83217E−03 | 1.46532E−02 |
| A6 = | 1.05709E−01 | 4.19767E−02 | −1.48447E−02 | 6.24519E−03 |
| A8 = | −5.01661E−02 | −1.34813E−03 | 2.12493E−02 | −5.11967E−03 |
| A10 = | 1.87024E−02 | −5.93645E−03 | −6.11528E−03 | 4.65652E−03 |
| A12 = | −9.97343E−03 | 2.02829E−03 | −7.05078E−04 | −2.06127E−03 |
| A14 = | 4.66106E−03 | −3.64834E−05 | 6.49436E−04 | 4.75093E−04 |
| A16 = | −9.38111E−04 | −7.14048E−05 | −9.96671E−05 | −4.91615E−05 |

TABLE 3

| (Embodiment 2) f(focal length) = 4.26 mm, Fno = 2.60, HFOV(Half of Field of View) = 37.7 deg. | | | | | | | |
|---|---|---|---|---|---|---|---|
| Surface# | | Curvature Radius | Thickness | Material | Index | Abbe# | Focal length |
| 0 | Object | Plano | Infinity | | | | |
| 1 | Lens 1 | 1.64261 (ASP) | 0.666 | Plastic | 1.544 | 55.9 | −4.86 |
| 2 | | 0.86860 (ASP) | 1.728 | | | | |
| 3 | Lens 2 | 2.46949 (ASP) | 0.849 | Plastic | 1.544 | 55.9 | 3.35 |
| 4 | | −6.08610 (ASP) | 0.050 | | | | |
| 5 | Ape. Stop | Plano | 0.733 | | | | |
| 6 | Lens 3 | 6.60920 (ASP) | 0.328 | Plastic | 1.650 | 21.4 | −5.56 |
| 7 | | 2.29033 (ASP) | 0.216 | | | | |
| 8 | Lens 4 | −18.89290 (ASP) | 0.780 | Plastic | 1.530 | 55.8 | 4.05 |
| 9 | | −1.95355 (ASP) | 2.500 | | | | |
| 10 | IR-filter | Plano | 0.300 | Glass | 1.517 | 64.2 | — |
| 11 | | Plano | 0.500 | | | | |
| 12 | Cover-glass | Plano | 0.400 | Glass | 1.517 | 64.2 | — |
| 13 | | Plano | 0.858 | | | | |
| 14 | Image | Plano | — | | | | |

Note:
Reference wavelength is d-line 587.6 nm
ASP stands for aspherical surface

TABLE 4

| Aspheric Coefficients | | | | |
|---|---|---|---|---|
| Surface# | 1 | 2 | 3 | 4 |
| k = | −1.33264E+00 | −9.45681E−01 | −7.43492E−01 | 1.75147E+01 |
| A4 = | 7.34329E−03 | 4.70719E−02 | 1.72297E−02 | −2.88376E−03 |
| A6 = | −6.41450E−03 | −1.27961E−02 | 1.01582E−02 | 1.08313E−02 |
| A8 = | 1.44032E−05 | 3.36768E−03 | −8.29258E−03 | 4.09024E−05 |
| A10 = | 7.12716E−05 | −1.92687E−03 | 6.73649E−03 | 1.81848E−03 |
| A12 = | −2.93603E−06 | −8.76364E−04 | −1.92479E−03 | −5.32333E−05 |
| A14 = | | 2.25838E−04 | 2.44220E−04 | −6.53622E−05 |
| A16 = | | | −3.06762E−05 | 1.09514E−05 |
| Surface# | 6 | 7 | 8 | 9 |
| k = | −1.00000E+00 | −1.15455E+01 | −1.00000E+00 | −6.12172E−01 |
| A4 = | −2.35377E−01 | −1.16843E−01 | 1.26862E−02 | 1.43653E−02 |
| A6 = | 8.49848E−02 | 3.49282E−02 | −6.39716E−03 | 6.54886E−03 |
| A8 = | −3.69112E−02 | 2.60589E−03 | 1.76737E−02 | 1.25424E−03 |
| A10 = | 1.36820E−02 | −6.20284E−03 | −5.33470E−03 | 5.51920E−03 |
| A12 = | −9.97343E−03 | 2.02846E−03 | −7.89141E−04 | −2.62660E−03 |
| A14 = | 4.66106E−03 | −3.64836E−05 | 6.49125E−04 | 4.60386E−04 |
| A16 = | −9.38111E−04 | −7.14048E−05 | −9.96671E−05 | −4.91599E−05 |

TABLE 5

| (Embodiment 3)<br>f(focal length) = 4.24 mm, Fno = 2.80, HFOV(Half of Field of View) = 37.5 deg. | | | | | | | |
|---|---|---|---|---|---|---|---|
| Surface# | | Curvature Radius | Thickness | Material | Index | Abbe# | Focal length |
| 0 | Object | Plano | Infinity | | | | |
| 1 | Lens 1 | 2.30817 (ASP) | 1.437 | Plastic | 1.530 | 55.8 | −7.38 |
| 2 | | 1.13877 (ASP) | 4.300 | | | | |
| 3 | Ape. Stop | Plano | 0.070 | | | | |
| 4 | Lens 2 | 2.27280 | 1.257 | Glass | 1.517 | 64.2 | 3.20 |
| 5 | | −4.93630 | 0.511 | | | | |
| 6 | Lens 3 | 12.22500 (ASP) | 0.300 | Plastic | 1.632 | 23.4 | −4.99 |
| 7 | | 2.48465 (ASP) | 0.550 | | | | |
| 8 | Lens 4 | 21.76590 (ASP) | 0.676 | Plastic | 1.530 | 55.8 | 6.87 |
| 9 | | −4.32670 (ASP) | 2.000 | | | | |
| 10 | IR-filter | Plano | 0.300 | Glass | 1.517 | 64.2 | — |
| 11 | | Plano | 0.500 | | | | |
| 12 | Cover-glass | Plano | 0.400 | Glass | 1.517 | 64.2 | — |
| 13 | | Plano | 0.806 | | | | |
| 14 | Image | Plano | — | | | | |

Note:
Reference wavelength is d-line 587.6 nm
ASP stands for aspherical surface

TABLE 6

| Aspheric Coefficients | | | |
|---|---|---|---|
| Surface# | 1 | 2 | 6 |
| k = | −2.94528E+00 | −1.04185E+00 | −1.00000E+00 |
| A4 = | 2.12366E−02 | 2.98180E−02 | −1.60581E−01 |
| A6 = | −2.75958E−03 | 1.83102E−03 | 1.05100E−01 |
| A8 = | 1.88082E−04 | −2.25581E−03 | −5.51268E−02 |
| A10 = | −5.76920E−06 | 9.39410E−04 | 1.96093E−02 |
| A12 = | 1.83495E−08 | −1.28065E−04 | −9.97343E−03 |
| A14 = | | 1.02269E−05 | 4.66106E−03 |
| A16 = | | | −9.38111E−04 |

TABLE 6-continued

| Aspheric Coefficients | | | |
|---|---|---|---|
| Surface# | 7 | 8 | 9 |
| k = | −1.32234E+01 | −1.00000E+00 | −1.19102E−01 |
| A4 = | −5.36050E−02 | 6.86188E−03 | 1.25931E−02 |
| A6 = | 4.26331E−02 | −1.77352E−02 | 1.17631E−03 |
| A8 = | −5.16468E−03 | 1.94171E−02 | −3.16974E−03 |
| A10 = | −5.15517E−03 | −5.37792E−03 | 4.54995E−03 |
| A12 = | 2.02829E−03 | −6.86504E−04 | −2.05658E−03 |
| A14 = | −3.64831E−05 | 6.54031E−04 | 4.74514E−04 |
| A16 = | −7.14047E−05 | −1.01965E−04 | −4.98153E−05 |

TABLE 7

| (Embodiment 4) f(focal length) = 4.16 mm, Fno = 2.40, HFOV(Half of Field of View) = 38.7 deg. | | | | | | | |
|---|---|---|---|---|---|---|---|
| Surface# | | Curvature Radius | Thickness | Material | Index | Abbe# | Focal length |
| 0 | Object | Plano | Infinity | | | | |
| 1 | Lens 1 | 2.16472 (ASP) | 0.991 | Plastic | 1.530 | 55.8 | −5.72 |
| 2 | | 1.06280 (ASP) | 3.160 | | | | |
| 3 | Lens 2 | 2.47419 (ASP) | 1.036 | Plastic | 1.544 | 55.9 | 3.50 |
| 4 | | −7.07580 (ASP) | 0.113 | | | | |
| 5 | Ape. Stop | Plano | 0.749 | | | | |
| 6 | Lens 3 | −22.23530 (ASP) | 0.300 | Plastic | 1.634 | 23.8 | −3.76 |
| 7 | | 2.68078 (ASP) | 0.133 | | | | |
| 8 | Lens 4 | 8.91880 (ASP) | 0.861 | Plastic | 1.544 | 55.9 | 3.74 |
| 9 | | −2.54761 (ASP) | 3.000 | | | | |
| 10 | IR-filter | Plano | 0.300 | Glass | 1.517 | 64.2 | — |
| 11 | | Plano | 0.500 | | | | |
| 12 | Cover-glass | Plano | 0.400 | Glass | 1.517 | 64.2 | — |
| 13 | | Plano | 0.459 | | | | |
| 14 | Image | Plano | — | | | | |

Note:
Reference wavelength is d-line 587.6 nm
ASP stands for aspherical surface

TABLE 8

| Aspheric Coefficients | | | | |
|---|---|---|---|---|
| Surface# | 1 | 2 | 3 | 4 |
| k = | −2.39100E+00 | −1.06464E+00 | −1.05501E+00 | −1.80074E+00 |
| A4 = | 1.52435E−02 | 3.21077E−02 | 1.41251E−02 | 5.51501E−03 |
| A6 = | −3.27144E−03 | −7.48317E−04 | 4.03454E−03 | 3.89984E−03 |
| A8 = | 1.94160E−04 | −1.85500E−03 | −1.35668E−03 | −1.83982E−03 |
| A10 = | −1.92003E−06 | 5.98050E−04 | 1.20877E−03 | 1.04995E−03 |
| A12 = | −2.03381E−07 | −1.26380E−04 | −6.17990E−04 | −5.32376E−05 |
| A14 = | | 7.27083E−06 | 2.44220E−04 | −6.53620E−05 |
| A16 = | | | −3.06762E−05 | 1.09514E−05 |
| Surface# | 6 | 7 | 8 | 9 |
| k = | −1.00000E+00 | −1.41452E+01 | −1.00000E+00 | −5.23762E−01 |
| A4 = | −1.58683E−01 | −7.71792E−02 | −3.67721E−03 | 1.27882E−02 |
| A6 = | 9.62742E−02 | 4.05792E−02 | −1.49670E−02 | 6.72717E−03 |
| A8 = | −4.39444E−02 | −1.84316E−03 | 1.89974E−02 | −5.28583E−03 |
| A10 = | 1.59901E−02 | −5.69139E−03 | −5.41236E−03 | 4.82473E−03 |
| A12 = | −9.97343E−03 | 2.02829E−03 | −7.05078E−04 | −2.06127E−03 |
| A14 = | 4.66106E−03 | −3.64834E−05 | 6.49436E−04 | 4.75093E−04 |
| A16 = | −9.38111E−04 | −7.14048E−05 | −9.96671E−05 | −4.91615E−05 |

TABLE 9

| (Embodiment 5) f(focal length) = 4.23 mm, Fno = 2.40, HFOV(Half of Field of View) = 38.2 deg. | | | | | | | |
|---|---|---|---|---|---|---|---|
| Surface# | | Curvature Radius | Thickness | Material | Index | Abbe# | Focal length |
| 0 | Object | Plano | Infinity | | | | |
| 1 | Lens 1 | 2.56165 (ASP) | 1.091 | Plastic | 1.530 | 55.8 | −4.51 |
| 2 | | 1.05441 (ASP) | 1.900 | | | | |
| 3 | Lens 2 | 2.36183 (ASP) | 1.238 | Plastic | 1.544 | 55.9 | 3.23 |
| 4 | | −5.63280 (ASP) | 0.193 | | | | |
| 5 | Ape. Stop | Plano | 0.592 | | | | |
| 6 | Lens 3 | −21.63070 (ASP) | 0.339 | Plastic | 1.634 | 23.8 | −3.81 |
| 7 | | 2.73539 (ASP) | 0.115 | | | | |
| 8 | Lens 4 | 9.49800 (ASP) | 0.934 | Plastic | 1.544 | 55.9 | 3.39 |
| 9 | | −2.20980 (ASP) | 3.000 | | | | |
| 10 | IR-filter | Plano | 0.300 | Glass | 1.517 | 64.2 | — |
| 11 | | Plano | 0.500 | | | | |

TABLE 9-continued

| (Embodiment 5) f(focal length) = 4.23 mm, Fno = 2.40, HFOV(Half of Field of View) = 38.2 deg. | | | | | | | |
|---|---|---|---|---|---|---|---|
| Surface# | | Curvature Radius | Thickness | Material | Index | Abbe# | Focal length |
| 12 | Cover-glass | Plano | 0.400 | Glass | 1.517 | 64.2 | — |
| 13 | | Plano | 0.499 | | | | |
| 14 | Image | Plano | — | | | | |

Note:
Reference wavelength is d-line 587.6 nm
ASP stands for aspherical surface

TABLE 10

| Aspheric Coefficients | | | | |
|---|---|---|---|---|
| Surface# | 1 | 2 | 3 | 4 |
| k = | −3.29342E+00 | −9.78536E−01 | −8.80537E−01 | 2.31172E+00 |
| A4 = | 1.49176E−02 | 3.97373E−02 | 1.56457E−02 | 3.53770E−03 |
| A6 = | −3.43622E−03 | 2.81602E−04 | 4.20254E−03 | 5.32488E−03 |
| A8 = | 1.86288E−04 | −1.61664E−03 | −1.15573E−03 | −1.96488E−03 |
| A10 = | −7.66727E−07 | 2.61580E−04 | 1.06722E−03 | 1.04325E−03 |
| A12 = | −2.03207E−07 | −2.37320E−04 | −6.17990E−04 | −5.32378E−05 |
| A14 = | | 2.71987E−05 | 2.44220E−04 | −6.53620E−05 |
| A16 = | | | −3.06762E−05 | 1.09514E−05 |
| Surface# | 6 | 7 | 8 | 9 |
| k = | −1.00000E+00 | −1.34977E+01 | −1.00000E+00 | −4.03376E−01 |
| A4 = | −1.64249E−01 | −8.09283E−02 | −4.86129E−03 | 1.15220E−02 |
| A6 = | 8.92677E−02 | 3.73626E−02 | −1.52744E−02 | 6.22065E−03 |
| A8 = | −4.47876E−02 | −2.84036E−03 | 1.81842E−02 | −5.48372E−03 |
| A10 = | 1.45668E−02 | −5.32865E−03 | −5.01877E−03 | 5.19398E−03 |
| A12 = | −9.97343E−03 | 2.02829E−03 | −7.05078E−04 | −2.06127E−03 |
| A14 = | 4.66106E−03 | −3.64834E−05 | 6.49436E−04 | 4.75093E−04 |
| A16 = | −9.38111E−04 | −7.14048E−05 | −9.96671E−05 | −4.91615E−05 |

TABLE 11

| | Embodiment 1 | Embodiment 2 | Embodiment 3 | Embodiment 4 | Embodiment 5 |
|---|---|---|---|---|---|
| f | 4.28 | 4.26 | 4.24 | 4.16 | 4.23 |
| Fno | 2.45 | 2.60 | 2.80 | 2.40 | 2.40 |
| HFOV | 37.5 | 37.7 | 37.5 | 38.7 | 38.2 |
| \| N2 + N3 − 2N1 \| | 0.10 | 0.11 | 0.09 | 0.12 | 0.12 |
| V4 − V3 | 32.40 | 34.40 | 32.40 | 32.10 | 32.10 |
| CT4/CT1 | 0.81 | 0.17 | 0.47 | 0.87 | 0.86 |
| (T34/f) × 100 | 3.74 | 5.07 | 12.97 | 3.20 | 2.72 |
| (R1 + R2)/(R1 − R2) | 3.19 | 3.24 | 2.95 | 2.93 | 2.40 |
| R3/R4 | −0.39 | −0.41 | −0.46 | −0.35 | −0.42 |
| R6/R5 | 0.13 | 0.35 | 0.20 | −0.12 | −0.13 |
| f/f2 | 1.14 | 1.27 | 1.33 | 1.19 | 1.31 |
| SAG12/CT1 | 2.29 | 1.99 | 1.42 | 1.98 | 1.53 |
| Dr1r3/Dr3r8 | 1.62 | 0.81 | 1.76 | 1.30 | 0.88 |
| SL/TTL | 0.52 | 0.66 | 0.55 | 0.55 | 0.59 |
| Imgh/f | 0.77 | 0.78 | 0.78 | 0.79 | 0.78 |
| TTL/Imgh | 3.90 | 2.93 | 3.90 | 3.56 | 3.29 |

What is claimed is:

1. An optical imaging lens assembly, in order from an object side to an image side, comprising:

a first lens element with negative refractive power having a convex object-side surface and a concave image-side surface;

a second lens element with positive refractive power;

a third lens element with negative refractive power having a concave image-side surface and at least one of an object-side surface and the image-side surface of the third lens element being aspheric;

a fourth lens element with positive refractive power having a convex image-side surface and at least one of an object-side surface and the image-side surface of the fourth lens element being aspheric; and a stop being disposed between the first lens element and the third lens element;

wherein the second lens element has a convex object-side surface, and the third lens element and the fourth lens element are made of plastic; and wherein a central thickness of the first lens element is CT1, a central thickness of the fourth lens element is CT4, a curvature radius of the object-side surface of the third lens element is R5, a curvature radius of the image-side surface of the third lens element is R6, an axial distance between the stop and an image plane is SL, an axial distance from the object-side surface of the first lens element to the image plane is TTL, and they satisfy the following relations:

$$0.3<CT4/CT1<1.5;$$

$$-1.5<R6/R5<1.5;$$

$$0.40<SL/TTL<0.75.$$

2. The optical imaging lens assembly as claimed in claim 1, wherein the curvature radius of the object-side surface of the third lens element is R5, the curvature radius of the image-side surface of the third lens element is R6, and they preferably satisfy the relation:

$$-0.5<R6/R5<0.5.$$

3. The optical imaging lens assembly as claimed in claim 1, wherein a refractive index of the first lens element is N1, a refractive index of the second lens element is N2, a refractive index of the third lens element is N3, and they satisfy the relation:

$$|N2+N3-2N1|<0.15.$$

4. The optical imaging lens assembly as claimed in claim 1, wherein the optical imaging lens assembly further comprises an image sensor at the image plane, half of a diagonal length of an effective photosensitive area of the image sensor is Imgh, a focal length of the optical imaging lens assembly is f, and they satisfy the relation:

$$0.70<\mathrm{Img}h/f<0.92.$$

5. The optical imaging lens assembly as claimed in claim 1, wherein the central thickness of the first lens element is CT1, a distance between a position of the largest effective diameter of the image-side surface of the first lens element and a tangent through the vertex on the optical axis of the image-side surface of the first lens element is SAG12, and they satisfy the relation:

$$1.5<SAG12/CT1<2.5.$$

6. The optical imaging lens assembly as claimed in claim 1, wherein at least one inflection point is formed on at least one of the object-side surface and the image-side surface of the fourth lens element.

7. The optical imaging lens assembly as claimed in claim 6, wherein a curvature radius of the object-side surface of the second lens element is R3, a curvature radius of the image-side surface of the second lens element is R4, and they satisfy the relation:

$$-1.5<R3/R4<1.5.$$

8. The optical imaging lens assembly as claimed in claim 7, wherein a curvature radius of the object-side surface of the first lens element is R1, a curvature radius of the image-side surface of the first lens element is R2, and they satisfy the relation:

$$2.1<(R1+R2)/(R1-R2)<5.0.$$

9. The optical imaging lens assembly as claimed in claim 7, wherein the curvature radius of the object-side surface of the second lens element is R3, the curvature radius of the image-side surface of the second lens element is R4, and they preferably satisfy the relation:

$$-0.7<R3/R4<-0.05.$$

10. The optical imaging lens assembly as claimed in claim 9, wherein a distance between the object-side surface of the first lens element and the object-side surface of the second lens element is Dr1r3, a distance between the object-side surface of the second lens element and the image-side surface of the fourth lens element is Dr3r8, and they satisfy the relation:

$$1.2<Dr1r3/Dr3r8<2.0.$$

11. The optical imaging lens assembly as claimed in claim 9, wherein the focal length of the optical imaging lens assembly is f, a focal length of the second lens element is f2, an Abbe number of the third lens element is V3, an Abbe number of the fourth lens element is V4, and they satisfy the following relations:

$$0.9<f/f2<1.5;$$

$$28<V4-V3<45.$$

12. An optical imaging lens assembly, in order from an object side to an image side, comprising:

a first lens element with negative refractive power having a convex object-side surface and a concave image-side surface;

a second lens element with positive refractive power having a convex object-side surface;

a third lens element with negative refractive power and made of plastic while having at least one of an object-side surface and an image-side surface of the third lens element being aspheric;

a fourth lens element with positive refractive power and made of plastic while having at least one of an object-side surface and an image-side surface of the fourth lens element being aspheric; and a stop being disposed between the first lens element and the third lens element;

wherein a curvature radius of the object-side surface of the first lens element is R1, a curvature radius of the image-side surface of the first lens element is R2, a curvature radius of the object-side surface of the second lens element is R3, a curvature radius of an image-side surface of the second lens element is R4, an axial distance between the third lens element and the fourth lens element is T34, a focal length of the optical imaging lens assembly is f, a refractive index of the first lens element is N1, a refractive index of the second lens element is N2, a refractive index of the third lens element is N3, and they satisfy the following relations:

$$2.1<(R1+R2)/(R1-R2)<5.0;$$

$$-0.7<R3/R4<-0.05$$

$$1.2<(T34/f)*100<15.0;$$

$$|N2+N3-2N1|<0.15.$$

13. The optical imaging lens assembly as claimed in claim 12, wherein the third lens element has a concave image-side surface, and the fourth lens element has a convex image-side surface.

14. The optical imaging lens assembly as claimed in claim 13, wherein the focal length of the optical imaging lens assembly is f, a focal length of the second lens element is f2, and they satisfy the relation:

$$0.9<f/f2<1.5.$$

15. The optical imaging lens assembly as claimed in claim 14, wherein an Abbe number of the third lens element is V3, an Abbe number of the fourth lens element is V4, and they satisfy the relation: $28<V4-V3<45$.

16. The optical imaging lens assembly as claimed in claim 15, wherein a curvature radius of the object-side surface of the third lens element is R5, a curvature radius of the image-side surface of the third lens element is R6, and they satisfy the relation:

$$-1.5<R6/R5<1.5.$$

17. The optical imaging lens assembly as claimed in claim 16, wherein the axial distance between the third lens element and the fourth lens element is T34, the focal length of the optical imaging lens assembly is f, and they further satisfy the relation:

$$1.5<(T34/f)*100<7.0.$$

18. The optical imaging lens assembly as claimed in claim 16, wherein the optical imaging lens assembly further comprises an image sensor at the image plane, half of a diagonal length of an effective photosensitive area of the image sensor is Imgh, and they satisfy the relation: $0.70<\mathrm{Imgh}/f<0.92$.

19. An optical imaging lens assembly, in order from an object side to an image side, comprising:

a first lens element with negative refractive power having a convex object-side surface and a concave image-side surface;

a second lens element with positive refractive power having a convex object-side surface and a convex image-side surface;

a third lens element with negative refractive power having a concave image-side surface and at least one of an object-side surface and the image-side surface of the third lens element being aspheric;

a fourth lens element with positive refractive power having a convex image-side surface and at least one of an object-side surface and the image-side surface of the fourth lens element being aspheric; and a stop being disposed between the first lens element and the third lens element;

wherein a curvature radius of the object-side surface of the second lens element is R3, a curvature radius of an image-side surface of the second lens element is R4, a focal length of the optical imaging lens assembly is f, a focal length of the second lens element is f2, a distance between a position of the largest effective diameter of the image-side surface of the first lens element and a tangent through the vertex on the optical axis of the image-side surface of the first lens element is SAG12, a central thickness of the first lens element is CT1, and they satisfy the following relations:

$$-0.7<R3/R4<-0.05$$

$$0.9<f/f2<1.5$$

$$1.5<SAG12/CT1<2.5.$$

20. The optical imaging lens assembly as claimed in claim 19, wherein the third lens element and the fourth lens element are made of plastic, an axial distance between the third lens element and the fourth lens element is T34, the focal length of the optical imaging lens assembly is f, and they satisfy the relation:

$$1.2<(T34/f)*100<15.0.$$

21. The optical imaging lens assembly as claimed in claim 20, wherein a curvature radius of the object-side surface of the third lens element is R5, a curvature radius of the image-side surface of the third lens element is R6, and they satisfy the relation:

$$-0.5<R6/R5<0.5.$$

22. The optical imaging lens assembly as claimed in claim 20, wherein the optical imaging lens assembly further comprises an image sensor at the image plane, half of a diagonal length of an effective photosensitive area of the image sensor is Imgh, and they satisfy the relation: $0.70<Imgh/f<0.92$.

* * * * *